(12) United States Patent
Bu et al.

(10) Patent No.: US 8,301,950 B2
(45) Date of Patent: Oct. 30, 2012

(54) METHOD FOR VARIABLE SUB-CARRIER MAPPING AND DEVICE USING THE SAME

(75) Inventors: Bing Bu, Beijing (CN); Xiaogiang Li, Beijing (CN); Yujian Zhang, Beijing (CN); Ju-Ho Lee, Suwon-si (KR)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 825 days.

(21) Appl. No.: 12/064,120

(22) PCT Filed: Aug. 16, 2006

(86) PCT No.: PCT/KR2006/003197
§ 371 (c)(1),
(2), (4) Date: May 28, 2009

(87) PCT Pub. No.: WO2007/021122
PCT Pub. Date: Feb. 22, 2007

(65) Prior Publication Data
US 2010/0031107 A1    Feb. 4, 2010

(30) Foreign Application Priority Data
Aug. 19, 2005    (CN) .......................... 2005 1 0092622

(51) Int. Cl.
*G08C 25/02*    (2006.01)
(52) U.S. Cl. ....................................................... 714/748
(58) Field of Classification Search .................... 714/748
See application file for complete search history.

(56) References Cited

U.S. PATENT DOCUMENTS

| | | | |
|---|---|---|---|
| 6,697,986 B2 | 2/2004 | Kim | |
| 7,164,727 B2* | 1/2007 | Wengerter et al. | 375/267 |
| 7,174,493 B2* | 2/2007 | Matsumoto et al. | 714/748 |
| 7,397,861 B2* | 7/2008 | Frederiksen et al. | 375/260 |
| 7,400,687 B2* | 7/2008 | Matsumoto et al. | 375/260 |
| 7,471,740 B2* | 12/2008 | Von Elbwart et al. | 375/298 |
| 7,864,903 B2* | 1/2011 | Murakami et al. | 375/347 |
| 2003/0039229 A1 | 2/2003 | Ostman | |
| 2003/0076870 A1* | 4/2003 | Moon et al. | 375/130 |
| 2003/0110436 A1 | 6/2003 | Golitschek Edler Von Elbwart et al. | |
| 2004/0199846 A1 | 10/2004 | Matsumoto et al. | |
| 2004/0221219 A1* | 11/2004 | Von Elbwart et al. | 714/748 |
| 2009/0063924 A1* | 3/2009 | Golitschek Edler Von Elbwart et al. | 714/748 |

FOREIGN PATENT DOCUMENTS

WO  PCT/KR2006/003197    11/2006 ................... 27/26
* cited by examiner

*Primary Examiner* — Yolanda L Wilson
(74) *Attorney, Agent, or Firm* — The Farell Law Firm, P.C.

(57) ABSTRACT

A variable sub-carrier mapping method comprising steps of: applying different bit interleaving schemes to different transmissions of a hybrid automatic retransmission request (HARQ) process in side of transmitter; and in the side of the transmitter, modulating symbols onto sub-carriers for transmitting. Different transmissions in one HARQ process adopt different bit interleavers or different symbol-to-sub-carrier mapping methods so as to realize that the same bit of different transmissions in one HARQ process is transmitted via different sub-carriers. Therefore, the system achieves the frequency diversity gain and reduces the probability of failure of HARQ transmission caused by that some bits are always transmitted via the sub-carrier with the same deep fading. In this way, the average HARQ retransmission times can be reduced and the system throughput can be improved.

27 Claims, 17 Drawing Sheets

METHOD FOR VARIABLE SUB-CARRIER MAPPING AND DEVICE USING THE SAME

BACKGROUND OF THE INVENTION

1. Field of the Invention

The present invention relates to data transmission in a wireless communication system, especially to a method for variable sub-carrier mapping and device using the same.

2. Description of the Related Art

Compared with the 3G system at present, the evolved next generation mobile communication system offers shorter transmission delay (including the time on access, air-interface transmission, network process and network transmission), higher user uplink/downlink data transmission rate, higher spectrum utilization factor, larger system coverage, and in the meantime, it reduces the network operator's construction cost and maintenance cost as much as possible. To meet the demand mentioned above, technique schemes such as AMC, HARQ, OFDM(A) (including Localized OFDM and Distributed OFDM) and SC-FDMA are being evaluated at present and may be adopted in the next generation mobile communication system. The transmission mechanism of Hybrid Automatic Retransmission Request (HARQ) is adopted in the uplink/downlink data service. With the technique of data retransmission, time diversity and combining gain can be obtained so that system's throughput rate can be effective improved.

OFDM (Orthogonal Frequency Division Multiplexing) is a special multi-carrier modulation/multiplexing technique. The block diagram of its transmitter/receiver is shown in FIG. 1. A single user's information stream is converted into multiple low-rate code streams from a serial to parallel which are simultaneously transmitted via a group of sub-carriers whose spectrums are superposed but orthogonal. The advantages of OFDM technique are as follows:

1) Better performance in anti-frequency selective fading and anti-narrow band interference. In a single-carrier system, a single fading or interference may cause the entire link out of work. But in a multi-carrier system, only a few carriers will be affected. In an OFDM system, user information stream is converted into multiple low-rate information streams from serial to parallel which are simultaneously transmitted via a group of sub-carriers. Each sub-carrier's signaling time is times longer than that in the single-carrier system with the same rate. This better improves OFDM's performance in anti-narrow-band interference and the channel's anti-fast fading. Meanwhile, with the sub-carrier's combining coding, the frequency diversity effect is gained for sub-channels so that the performance in anti-narrow-band interference and channel's anti-fast fading is improved.

2) Higher frequency utilization factor. OFDM adopts superposed but orthogonal sub-carriers as sub-channels, differing from the traditional system that applies guard bands in sub-channel's dividing, so that the frequency utilization factor is improved.

3) Suitable for data transmission in high rate. With the adaptive modulation mechanism, an OFDM system can apply different modulation schemes in different sub-carrier's modulation according to the channel conditions and the noise backgrounds. When the channel is in good condition, modulation scheme with high efficiency is applied. In addition, when the channel is in poor condition, the modulation scheme with powerful performance in anti-interference is applied. Furthermore, with the application of loadable algorithm, more data can be transmitted concentratively in high data rate via the channel with good conditions in the OFDM system. Thus, the technique of OFDM is very suitable for data transmission in high rate.

4) Better performance in anti-Inter-Symbol Interference (ISI). Besides the noise interference, ISI is the main interference in a digital communication system. Since OFDM adopts the cyclic prefix, it has better performance in anti-ISI. The capability in anti-frequency selective fading and anti-narrow-band interference is improved in OFDM. In a single-carrier system, one fading or interference can cause the entire link out of work, but in a multi-carrier system, only a few carriers would be affected.

5) In the technique of OFDM, the modulation/demodulation can be realized through the base-band IFFT/FFT, which bears available fast calculation method and can be conveniently implemented in a DSP chip and hardware structure.

However, OFDM has following disadvantages:

Sensitive to frequency deviation and phase noise so that attenuation is easily caused to the system; and comparatively higher Peak-to-Average Power Ratio (PAPR), which results in that the RF amplifier's power efficiency is poor.

Since the PAPR is high in a multi-carrier system, and considering factors such as the mobile set's transmission power, its size, its stand-by time, and the cell's coverage and so on, the technique of Single-Carrier Frequency Division Multiple Access (SC-FDMA) may be possibly adopted in the uplink of the next generation mobile communication system. Still multiple sub-carriers are adopted to transmit signals in a SC-FDMA system. But there's some difference between the SC-FDMA system and the multi-carrier system: in the multi-carrier system, each sub-carrier transmits a single modulated symbol, and in the SC-FDMA system, each sub-carrier transmits the whole modulated symbols information. The SC-FDMA signal can be generated in time domain or frequency domain approaches. The structure of the transmitter/receiver (the frequency domain implementation approach) is shown in FIG. 2.

HARQ (Hybrid Automatic Retransmission Request) is a link adaptive technique which is the marriage of Forward Error Correction (FEC) Coding and Automatic Retransmission Request (ARQ). With the application of FEC, the transmission reliability is improved. But in the case of better channel conditions, system's throughput is on the contrary reduced because of excessive error correction bits. In the case of not high error bit rate, ideal throughput can be obtained with ARQ. But the ARQ will bring about extra retransmission delay, so that it is considered to combine FEC with ARQ to generate the Hybrid ARQ. Each transmitted data packet contains check bits for error correction and error detection. If the number of error bits in the received data packet is within the range that can be corrected, any error will be corrected automatically; but if severe error (which is beyond the range that FEC can correct) comes across, retransmission is requested to the transmitter. HARQ is able to adaptively adjust with the change of the channel, i.e., it can elaborately regulate the data rate according to the channel conditions.

In order to make full use of the system resources and reduce the overhead in signalling and buffer, the N-channel Stop-and-Wait (N-SAW) HARQ transmission mechanism is applied in the system, as is shown in FIG. 3 in principle. With the N-SAW HARQ, data packets of N HARQ processes can be transmitted via a single channel. When the forward link is adopted to transmit the data packet of some HARQ process, the backward link is applied to transmit the response information of other HARQ processes. With the N-SAW HARQ, data transmission can be operated continuously via the forward link. The system resources are fully utilized. But in this case, it is necessary for the receiver to be able to buffer the information of N data packets.

N-SAW HARQ can be divided into two cases:

1) N-SAW synchronous HARQ: the HARQ process is initiated only at the specific moment.

$$t = m + k \times N \ (k=1, 2, \ldots, n_{max}) \quad (1)$$

Where: t denotes the TTI of retransmission; m denotes the TTI of the original transmission; $n_{max}$ denotes the maximum number of retransmission of HARQ; N denotes the number of HARQ processes.

2) N-SAW asynchronous HARQ: the HARQ process can be initiated at any moment after the response information to the previous data packet is received.

$$t \geq m + N \quad (2)$$

Where: t denotes the TTI of retransmission; m denotes the TTI for the transmission of the previous data packet; N denotes the number of HARQ processes.

To meet the demand of delay, shorter Transmission Time Interval (referred to as TTI) will be adopted in the next generation mobile communication system. Three possible TTI's lengths can be 0.5 ms, 0.625 ms and 0.667 ms. The TTI is used as the base time interval in N-SAW HARQ. In the N-SAW synchronous HARQ, the retransmission interval for the same data packet is N·TTI, and in N-SAW asynchronous HARQ, the retransmission interval for the same data packet is k·N·TTI (i<k<$n_{max}$) where: $n_{max}$ denotes the maximum number of retransmission in the HARQ process. In the case that N TTI is greater than channel's coherence time, the channel fading experienced by the retransmitted data packet in a HARQ process is different from that experienced by the data packets transmitted N TTI before in the HARQ process. And in the case that N TTI is less than channel's coherence time, the channel fading experienced by the retransmitted data packet in a HARQ process is similar to that experienced by the data packets transmitted N TTI before in the HARQ process. Although we can increase N to make N·TTI greater than channel's coherence time, it is not fit for the next generation mobile communication system, for the next generation mobile communication system adopts shorter TTI. Because the increase of N results in the increase of receive buffer (N HARQ processes corresponds to N buffers for soft-combination). In the meantime, the increase of N results in the increase of average delay (average delay=HARQ average retransmission times×N×TTI).

In a word, there is a problem going along with the application of the HARQ transmission mechanism in the next generation mobile communication system as follows:

Consecutive data packets transmitted in the same HARQ process experience similar channel fading. The sub-carrier adopted to transmit data packets by HARQ experiences deep fading, and so does to this sub-carrier during the process of retransmission.

SUMMARY OF THE INVENTION

Therefore, an object of the present invention is to provide a method for changing a mapping relationship between data bits and sub-carriers during a process of data transmission (including original transmission and retransmission processes) for a multi-carrier communication system in which HARQ mechanism is applied.

According to one aspect of the present invention, a variable sub-carrier mapping method comprising steps of:

applying different bit interleaving schemes to different retransmissions in side of transmitter for an automatic retransmission request; and in the side of the transmitter, modulating symbols onto sub-carriers for transmitting.

According to another aspect of the present invention, a variable sub-carrier mapping method comprising steps of:

in side of transmitter, applying different symbol-to-sub-carrier mapping methods to retransmissions for an automatic retransmission request; and in the side of the transmitter, modulating symbols onto sub-carriers for transmitting.

Different transmissions in one HARQ process adopt different bit inter-leaver or different symbol-to-sub-carrier mapping methods so as to realize that the same bits of different transmissions in one HARQ process is transmitted via different sub-carriers. Therefore, the system obtains the frequency diversity effect and reduces the probability of failure of HARQ transmission caused by that some bits are always transmitted via the sub-carrier with the same deep fading. In this way, the average HARQ retransmission times can be reduced and the system throughput can be improved.

BRIEF DESCRIPTION OF THE DRAWINGS

FIG. 8 is a block diagram illustrating a SC-FDMA transmitter/receiver that scheme 1, 2 are applied in;

FIG. 9 illustrates a system which has several interleavers and scheme 1, 2 are applied in;

DETAILED DESCRIPTION OF THE PREFERRED EMBODIMENTS

Figure 1:
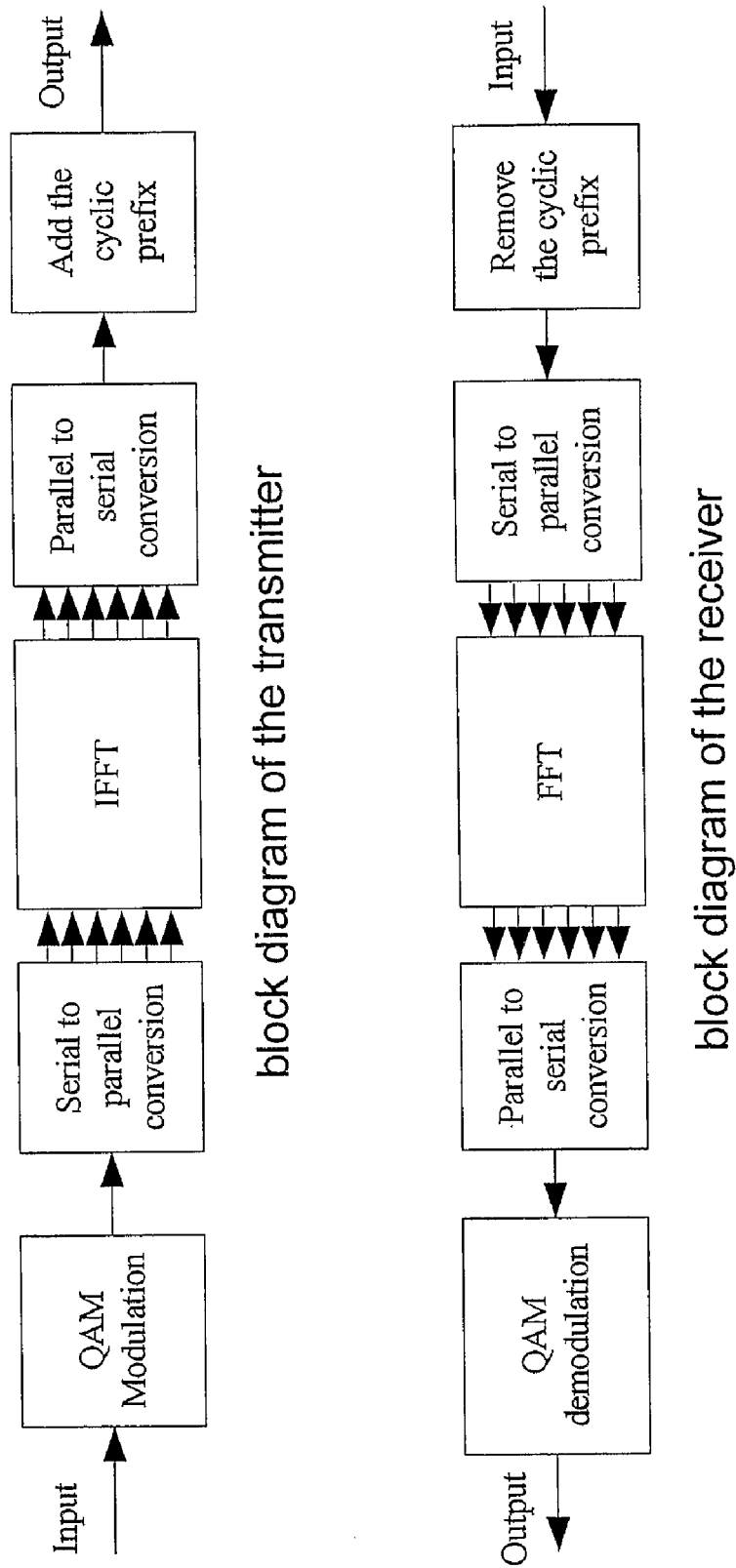
FIG. 1 is a block diagram illustrating an OFDM transmitter/receiver.
Figure 2:
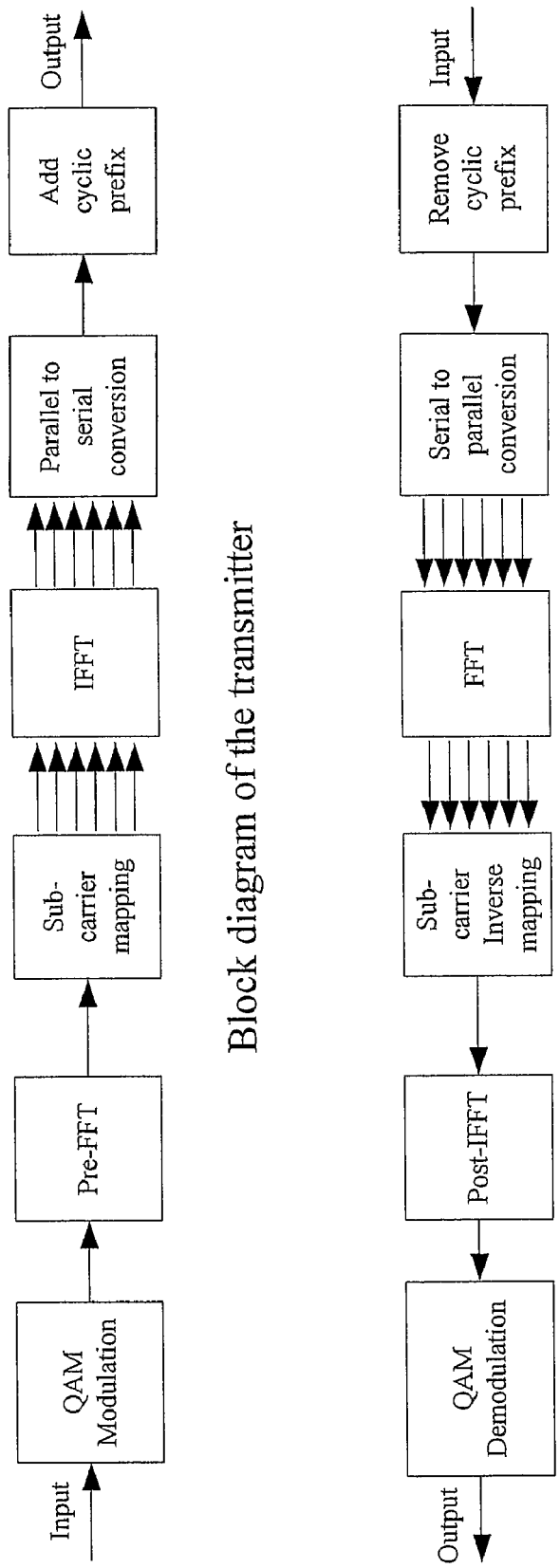
FIG. 2 is a block diagram illustrating a SC-FDMA transmitter/receiver (in the frequency domain)
Figure 3:
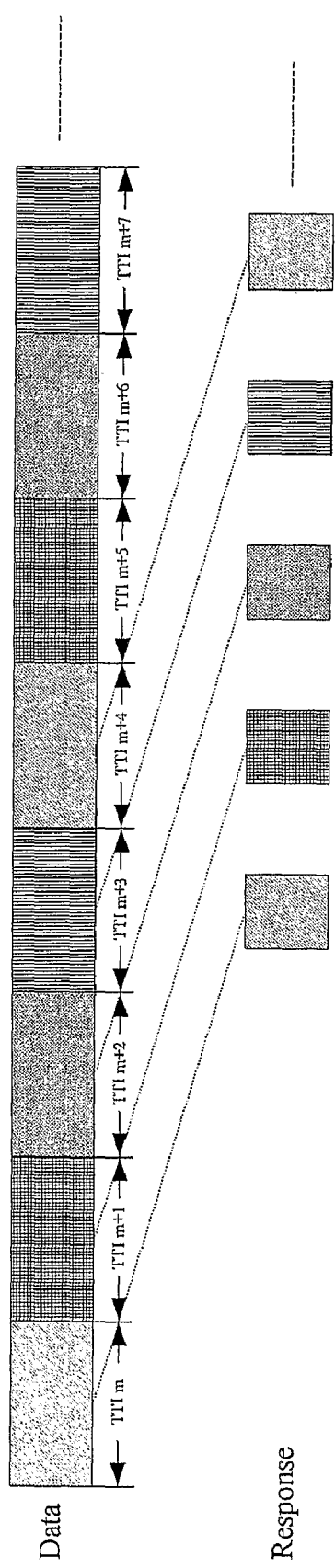
FIG. 3 illustrates a principle of N-SAW HARQ.

A transmission method with variable sub-carrier mapping mechanism is proposed in the present invention for the multi-carrier communication system in which the HARQ is applied. With this method, the same bit of different transmissions in one HARQ process is transmitted via different sub-carriers. Therefore, the system gains the frequency diversity effect and reduces the probability of failure of HARQ transmission caused by that some bits are always transmitted via the sub-carrier with the same deep fading.

In the present invention, three schemes are given as follows:

Scheme 1: in the HARQ process, different bit interleaving schemes are adopted in different transmissions. The bit-to-symbol mapping relationship is kept invariable by the bit interleaver. The symbol-to-sub-carrier mapping relationship is kept unchanged during the transmission process.

Scheme 2: in the HARQ process, different bit interleaving schemes are adopted in different transmissions. The bit interleaver can change the bit-to-symbol mapping relationship. The symbol-to-sub-carrier mapping relationship is kept unchanged during the transmission process.

Scheme 3: in the HARQ process, different symbol-to-sub-carrier mapping relationships are adopted in different transmissions. In the process of transmission, the bit interleaving scheme is kept unchanged.

Scheme 1

In the HARQ process, different bit interleaving schemes are adopted in different transmissions. The bit-to-symbol mapping relationship is kept invariable by the bit interleaver. The symbol-to-sub-carrier mapping relationship is kept invariable during the transmission process. With the application of different bit interleaving schemes, the same bits in different transmissions of one HARQ process are transmitted via different sub-carriers so that the frequency diversity gain can be achieved and the probability of failure of HARQ transmission caused by that some bits are always transmitted via the sub-carriers with the same deep fading is reduced. The interleaving schemes applied in transmissions are default to Node-B and user equipment (referred to as UE). No extra signaling burden is needed and the number of bit interleaving schemes equals to the maximum transmission times of HARQ.

With the application of the bit interleaving schemes in the transmission process, the mapping relationship between the bits and the modulation symbols is kept invariable. For instance, bit a, b, c and d are mapped to the same symbol in the original transmission, and after bit interleaving in retransmission, they are always mapped to one symbol except that the bit interleaver can change the sequence number of the mapped modulation symbol.

In the process of transmission, the more interval between the sub-carriers adopted to transmit the same bit is, the more gain of frequency diversity can be achieved. Given the bit interleaving schemes in the process of transmission, the priorities can be specified for bit locations according to the average interval between the sub-carriers adopted to transmit the same bit in the process of transmission. The bit bears higher priority if the average interval between the sub-carriers adopted for the bit's transmission in the transmission process is longer. In this bit location, data bit (such as the system bit, the same parity bit) with high priority is transmitted. The bit bears lower priority if the average interval between the sub-carriers adopted for the bit's transmission in the transmission process is shorter and in this bit location, data bit (such as the surplus parity bit) with low priority is transmitted.

Scheme 1 is implemented in following steps:

1. Set the Bit Interleaving Schemes for the Transmission Process

Based on the maximum transmission times of HARQ process, the bit interleaving scheme for each transmission is set and the symbol-to-sub-carrier mapping relationship is kept invariable. In the process of retransmission, the bit interleaver keeps the bit-to-symbol mapping relationship invariable.

2. Set the Priorities for Bit Locations

The priorities of bit locations can be set according to the average intervals between the sub-carriers adopted to transmit the same bit in the transmission process. The bit bears higher priority if the average interval between the sub-carriers adopted for the bit's transmission in the transmission process is longer, and the bit bears lower priority if the average interval between the sub-carriers adopted for the bit's transmission in the transmission process is shorter. The rest bit locations bear higher priorities.

The average interval between sub-carriers is defined as follows:

$$AVI = \frac{\sum_{i=1}^{n_{max}-1} \sum_{j=i+1}^{n_{max}} D_{i,j}}{C_{n_{max}}^2} \quad (3)$$

Where: AVI denotes the average interval between sub-carriers adopted in the process of transmission; $n_{max}$ denotes the maximum transmission times of the HARQ process; $D_{i,j}$ denotes the interval between the sub-carrier which is adopted to transmit a bit in the ith transmission and the one adopted to transmit the bit in the jth transmission of the HARQ process; $C_{2_{max}}^2$ denotes the number of choices by means of arbitrarily selecting two numbers from 1 to $n_{max}$.

3. Specify the Priorities for Data Bits

Specify priorities for data bits according to the applied HARQ mechanism (Chase combined HARQ, partly incremental redundancy HARQ, fully incremental redundancy HARQ).

Chase combined HARQ: The system bit bears the highest priority and the parity bit bears higher priority.

The partly incremental redundancy HARQ: the system bit bears the highest priority, the same parity bit bears higher priority, and the surplus parity bit bears lower priority.

The fully incremental redundancy HARQ: the system bit bears the highest priority, the same parity bit bears higher priority, and the surplus parity bit bears lower priority.

4. Bit Transmission

The bit location with highest priority is preferential to transmit data bit with highest priority. The bit location with higher priority is preferential to transmit data bit with highest and higher priorities. The bit locations with low priority are used to transmit the rest data bits. In implementation, the data bits with first high priority are arranged in the bit locations with first high priority for transmission, and the data bits with second high priority are arranged in the rest bit locations with the first high and second high priorities for transmission, and the data bits with low priority are arranged in the rest bit locations for transmission.

Scheme 2

In the HARQ process, different bit interleaving schemes are adopted in different transmissions. The bit interleaver can change the bit-to-symbol mapping relationship. The symbol-to-sub-carrier mapping relationship is kept invariable during the transmission process. With the application of different bit interleaving schemes, the same bit in different transmissions in one HARQ process is transmitted via different sub-carriers so that the gain of frequency diversity can be achieved. The probability of failure of HARQ transmission caused by that some bits are always transmitted via the sub-carriers with the same deep fading is reduced. The interleaving schemes applied in the process of transmission are default to the Node-B and the UE. No extra signaling burden is needed and the number of bit interleaving schemes equals the maximum transmission times of HARQ.

The mapping relationship between the bits and the modulated symbols can be changed by the bit interleaving scheme applied in the transmission process. For instance, bits a, b, c and d are mapped to the same symbol in the original transmission. After bit interleaving in the retransmission, they can be mapped to two or more symbols.

In the process of transmission, the bigger interval between the sub-carriers adopted to transmit the same bit is, the more gain of frequency diversity can be achieved. Given the bit interleaving schemes in the process of transmission, the priorities can be specified for bit locations according to the average intervals between the sub-carriers adopted to transmit the same bit in the process of transmission. The bit bears higher priority if the average interval between the sub-carriers adopted for the bit's transmission in the transmission process is bigger. In this bit location, data bit (such as the system bit, the same parity bit) with high priority is transmitted. The bit bears lower priority if the average interval between the sub-carriers adopted for the bit's transmission in the transmission process is smaller and in this bit location, data bit (such as the surplus parity bit) with low priority is transmitted.

Scheme 2 is implemented in following steps:

1. Set the Bit Interleaving Scheme for the Transmission Process

Based on the maximum transmission times of HARQ process, the bit interleaving scheme for each transmission is set and the symbol-to-sub-carrier mapping relationship is kept invariable. In the process of retransmission, the bit interleaver can change the mapping relationship between the bits and the modulated symbols.

2. Set the Priorities for Bit Locations

The priorities of bit locations can be set according to the average interval between the sub-carriers adopted to transmit the same bit in the transmission process. The bit bears higher priority if the average interval between the sub-carriers adopted for the bit's transmission in the transmission process is longer, and the bit bears lower priority if the average interval between the sub-carriers adopted for the bit's transmission in the transmission process is shorter. The rest bit locations bear higher priorities.

The definition of the average interval between sub-carriers is the same as that in scheme 1.

3. Specify the Priorities for Data Bits

Specify priorities for data bits according to the applied HARQ mechanism (Chase combined HARQ, partly incremental redundancy HARQ, fully incremental redundancy HARQ).

Chase combined HARQ: The system bit bears the highest priority and the parity bit bears higher priority.

The partly incremental redundancy HARQ: the system bit bears the highest priority, and the same parity bit bears higher priority, and the surplus parity bit bears lower priority.

The fully incremental redundancy HARQ: the system bit bears the highest priority, and the same parity bit bears higher priority, and the surplus parity bit bears lower priority.

4. Bit Transmission

The bit location with highest priority is preferential to transmit data bit with highest priority, the bit location with higher priority is preferential to transmit data bit with highest and higher priorities and the bit locations with low priority are used to transmit the rest data bits. In implementation, the data bits with first high priority are arranged in the bit locations with first high priority for transmission, and the data bits with second high priority are arranged in the rest bit locations with the first high and second high priorities for transmission, and the data bits with low priority are arranged in the rest bit locations for transmission.

Scheme 3

In the HARQ process, different symbol-to-sub-carrier mapping relationships are adopted in different transmissions. In the process of transmission, the bit interleaving scheme is kept invariable. With the adoption of different mapping relationships between the modulated symbols and the sub-carriers, the same bit in different transmissions of one HARQ process is transmitted via different sub-carriers so that the gain of frequency diversity can be achieved. The probability of failure of HARQ transmission caused by that some bits are always transmitted via the sub-carriers with the same deep fading is reduced. The interleaving schemes applied in the transmission are default to the Node-B and the UE. No extra signaling burden is needed and the number of adopted symbol-to-sub-carrier mapping relationships equals the maximum transmission times of HARQ.

In the process of transmission, the more interval between the sub-carriers adopted to transmit the same symbol is, the more obvious effect of frequency diversity can be obtained. Given the mapping relationship between the modulated symbols and the sub-carriers, the priorities can be specified for modulated symbols according to the average intervals between the sub-carriers adopted to transmit the same modulated symbol in the process of transmission. The symbol bears higher priority if the average interval between the sub-carriers adopted for the symbol's transmission in the transmission process is longer. And in this symbol location, data bit (such as the system bit, the same parity bit) with high priority is transmitted. The symbol bears lower priority if the average interval between the sub-carriers adopted for the symbol's transmission in the transmission process is shorter. In this symbol location, data bit (such as the surplus parity bit) with low priority is transmitted.

Scheme 3 is implemented in following steps:

1. Set the Symbol-to-Sub-Carrier Mapping Relationship for the Transmission Process In the light of the maximum transmission times in HARQ process, the symbol-to-sub-carrier mapping relationship is set for each transmission and the bit interleaving scheme is kept invariable.

2. Set the Priorities for Modulated Symbol Locations

The priorities of modulation symbol locations can be set according to the average intervals between the sub-carriers adopted to transmit the same modulation symbol in the transmission process. The modulated symbol bears higher priority if the average interval between the sub-carriers adopted for the modulated symbol's transmission in the transmission process is longer, and the modulated symbol bears lower priority if the average interval between the sub-carriers adopted for the modulated symbol's transmission in the transmission process is shorter. The rest modulated symbol locations bear higher priorities.

The average interval between sub-carriers is defined as follows:

$$AVI = \frac{\sum_{i=1}^{n_{max}-1} \sum_{j=i+1}^{n_{max}} D_{i,j}}{C_{n_{max}}^2} \quad (4)$$

Where: AVI denotes the average interval between the sub-carriers adopted in the process of transmission; $n_{max}$ denotes the maximum transmission times of the HARQ process; $D_{i,j}$ denotes the interval between the sub-carrier which is adopted to transmit a modulated symbol in the ith transmission and the one adopted to transmit the modulated symbol in the jth transmission of the HARQ process; $C_{n_{max}}^2$ denotes the number of choices by means of arbitrarily selecting two numbers from 1 to $n_{max}$.

3. Specify the Priorities for Data Bits

Specify priorities for data bits according to the applied HARQ mechanism (Chase combined HARQ, partly incremental redundancy HARQ, fully incremental redundancy HARQ).

Chase combined HARQ: The system bit bears the highest priority and the parity bit bears higher priority.

The partly incremental redundancy HARQ: the system bit bears the highest priority, and the same parity bit bears higher priority, and the surplus parity bit bears lower priority.

The fully incremental redundancy HARQ: the system bit bears the highest priority, and the same parity bit bears higher priority, and the surplus parity bit bears lower priority.

4. Bit Transmission

The modulated symbol location with highest priority is preferential to transmit data bit with highest priority, the modulated symbol location with higher priority is preferential to transmit data bit with highest and higher priorities and the modulated symbol locations with low priority are used to transmit the rest data bits. In implementation, the data bits with first high priority are arranged in the modulated symbol locations with first high priority for transmission, and the data bits with second high priority are arranged in the rest modulated symbol locations with the first high and second high priorities for transmission, and the data bits with low priority are arranged in the rest modulation symbol locations for transmission.

Two kinds of transmitting devices and receiving devices with variable sub-carriers mapping are offered in the present invention.

1) The Transmitting Device with Variable Interleaving Schemes

Figure 4:
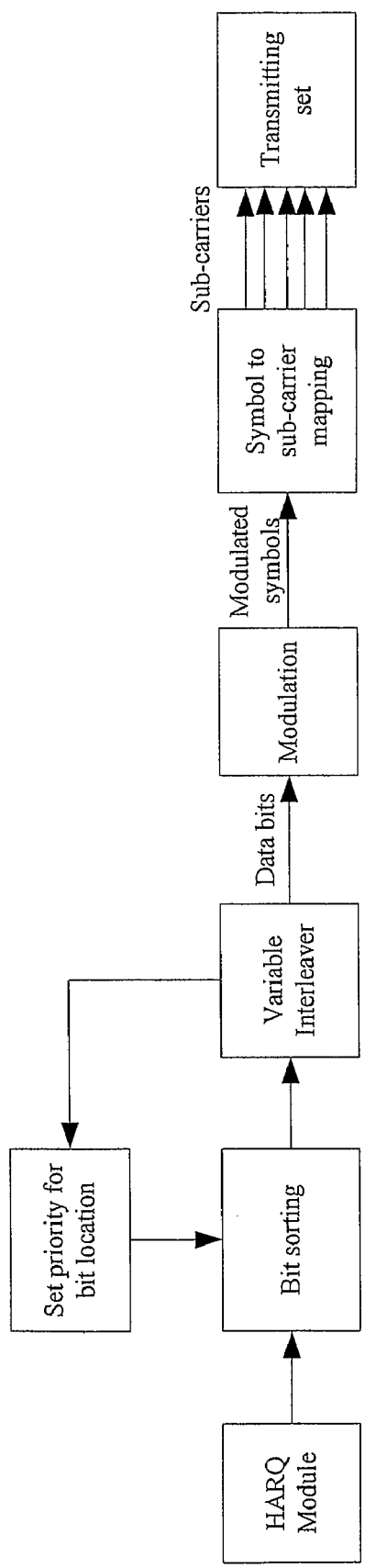
FIG. 4 shows a transmitting device with variable interleaving schemes.

As shown in FIG. 4, this device includes following function modules: HARQ module, module for setting priority for bit locations, module for bit sorting, variable interleaver, modulation module, symbol-to-sub-carrier mapping module, and transmitting means. Herein, "module" refers to hardware or a combination of hardware and software. The HARQ module outputs the data bits of each transmission according to the response information from the receivers. The module used to set priority for bit locations specifies priorities for bit locations according to the bit interleaving scheme adopted in the transmission process. The bit bears high priority if the interval between the sub-carriers adopted to transmit the same bit in the transmission process is longer, and the bit bears low priority if the interval between the sub-carriers adopted to transmit the same bit in the transmission process is shorter. The bit sorting module completes the task of data bit's priority setting and transmitting. The priorities are set for data bits according to the applied HARQ mechanism and the slotting scheme adopted in each HARQ transmission. The system bit bears the highest priority, the same parity bit in the transmission process bears higher priority and the surplus parity bit bears low priority. With the help of the input of the module used to set priority for bit locations, the bit sorting module arranges the data bit with the first high priority in the bit location with the first high priority for transmission, and arranges the data bits with the second priority in the rest bit locations with the first and the second priorities for transmission. The data bits with low priority are arranged in the rest bit locations for transmission. The variable interleaver module is responsible for data bit interleaving. Different interleaving schemes are adopted in different HARQ transmission and in the transmission process, and the mapping relationship between the bits and the modulation symbols can be changed or kept unchanged.

The modulation module is responsible for modulating the data bits and outputting the modulated symbols. The symbol-to-sub-carrier mapping module maps the input modulation symbols to the sub-carriers, which are transmitted via the transmitting means.

2) The Receiving Device with Variable De-Interleaving Scheme

Figure 5:
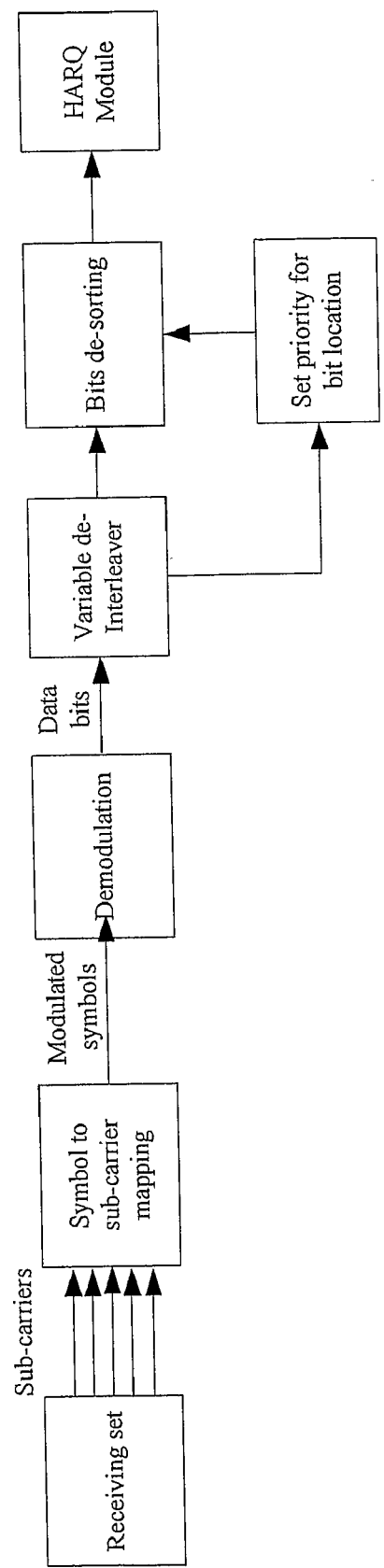
FIG. 5 shows a receiving device with variable de-interleaving schemes.

As shown in FIG. 5, this device includes the following function modules: receiving means, symbol-to-sub-carrier mapping module, demodulation module, the variable de-interleaver, module for setting priority for bit location, bit de-sorting module and HARQ module. Here, the symbol-to-sub-carrier mapping module obtains the modulated symbols transmitted through each sub-carrier. The demodulation module is responsible for demodulating the modulated symbols to output data bits. The variable de-interleaver is responsible for de-interleaving the data bits. Different de-interleaving schemes are adopted in different HARQ transmissions. The module for setting priority for bit locations specifies priorities for bit locations according to the bit de-interleaving scheme adopted in the transmission process. The bit location bears high priority if the interval between the sub-carriers adopted to transmit the same bit in transmission process is longer, and the bit location bears low priority if the interval between the sub-carriers adopted to transmit the same bit in transmission process is shorter. The bit de-sorting module specifies the number of such bits as the system ones, the same parity ones and surplus parity ones according to the applied HARQ mechanism and the slotting scheme in each HARQ transmission. With the help of the input of the module for setting priority for bit locations, the bit de-sorting module sequentially reads corresponding number of data bits from the corresponding bit locations. The HARQ module performs soft combination and decoding to data packets of each transmission, and generates the response message according to the decoding result.

Figure 6:
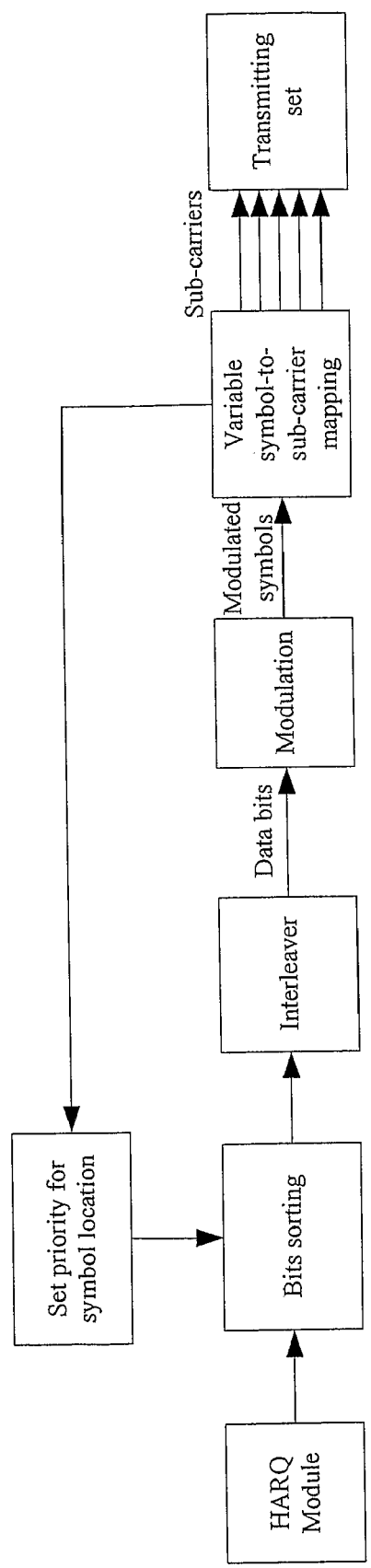
FIG. 6 shows a transmitting device with variable symbol-to-sub-carrier mapping relationships.

3) The Transmitting Device with Variable Mapping Relationship Between the Modulated Symbols and the Sub-Carriers As shown in FIG. 6, this device includes following function modules: HARQ module, module for setting priority for bit locations, module for bit sorting, interleaver, modulation module, variable symbol-to-sub-carrier mapping module, and transmitting means. Here, the HARQ module outputs the data bits of each transmission according to the response information from the receivers. The module for setting priority for modulation symbol locations specifies priorities for modulation symbol locations according the mapping relationship between the modulation symbols and the sub-carriers adopted in the transmission process. The modulation symbol location bears high priority if the interval between the sub-carriers adopted to transmit the same modulation symbol in the transmission process is longer, and the modulation symbol location bears low priority if the interval between the sub-carriers adopted to transmit the same modulation symbol in the transmission process is shorter. The bit sorting module completes the task of data bit's priority setting and transmitting. The priorities are set for data bits according to the applied HARQ mechanism and the slotting scheme adopted in each HARQ transmission. The system bit bears the highest priority, the same parity bit in the transmission process bears higher priority, and the surplus parity bit bears low priority. With the help of the input of the module used to set priority for modulation symbol locations, the bit sorting module arranges the data bit with the first high priority in the modulation symbol location with the first high priority for transmission, and arranges the data bits with the second priority in the rest modulation symbol locations with the first and the second priorities for transmission. The data bits with low priority are arranged in the rest modulation symbol locations for transmission. The interleaver module is responsible for data bit interleaving. The modulation module is responsible for modulating the data bits and outputting the modulated symbols. The symbol-to-sub-carrier mapping module maps the input data bits to the sub-carriers, which are transmitted via the transmitting means, according to the mapping relationship between the modulation symbols and the sub-carriers in each HARQ transmission.

Figure 7:
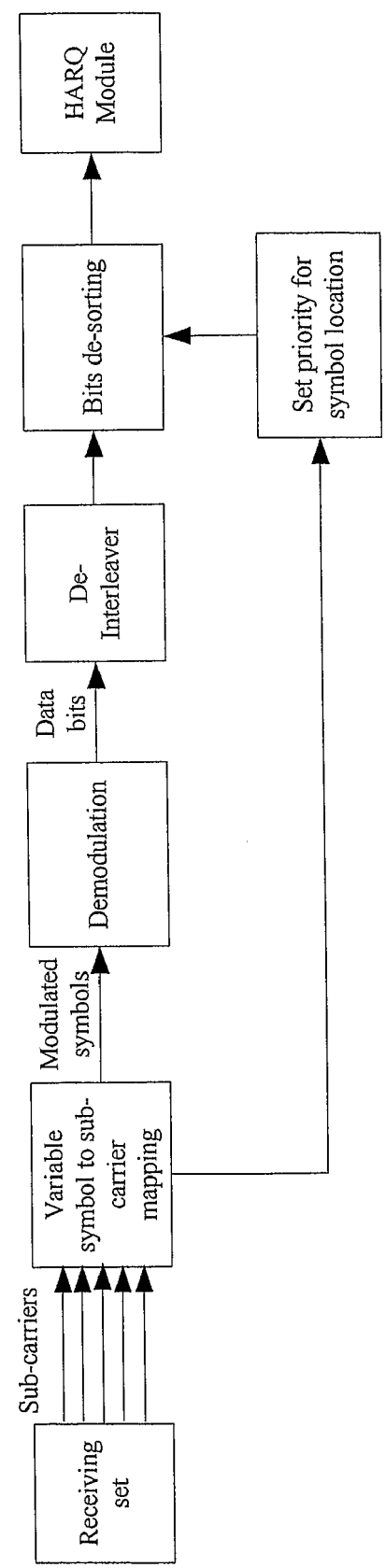
FIG. 7 shows a receiving device with variable symbol-to-sub-carrier mapping relationships.

4) The Receiving Device with Variable Mapping Relationship Between the Modulated Symbols and the Sub-Carriers As shown in FIG. 7, this device includes the following function modules: receiving means, variable symbol-to-sub-carrier mapping module, demodulation module, de-interleaver, module for setting priority for bit location, bit de-sorting module and HARQ module. Here, the variable symbol-to-sub-carrier mapping module obtains the modulated symbols transmitted through each sub-carrier according to the mapping relationship between the modulation symbols and the sub-carriers in each HARQ transmission. The demodulation module is responsible for demodulating the modulated symbols to output data bits.

The de-interleaver is responsible for de-interleaving the data bits. The module used to set priority for modulated symbol locations specifies priorities for modulation symbol locations according to the mapping relationship between the modulation symbols and the sub-carriers adopted in the transmission process. The modulation symbol location bears high priority if the interval between the sub-carriers adopted to transmit the same modulation symbol in transmission process is longer, and the modulation symbol location bears low priority if the interval between the sub-carriers adopted to transmit the same modulation symbol in transmission process is shorter. The bit de-sorting module specifies the number of such bits as the system ones, the same parity ones and surplus parity ones according to the applied HARQ mechanism and the slotting scheme in each HARQ transmission. With the help of the input of the module used to set priority for modulation symbol locations, the bit de-sorting module sequentially reads corresponding number of data bits from the corresponding modulation symbol locations. The HARQ module performs soft combination and decoding to data packets of each transmission, and generates the response message according to the decoding result.

Embodiment 1

Different bit interleaving schemes are applied in different HARQ transmissions. With the bit interleaving scheme, the mapping relationship between the bits and the modulation symbols is kept unchanged.

A HARQ transmission data packet includes N bits:

$$N = m \times n \tag{5}$$

Where: m denotes the number of bits included in each modulated symbol; n denotes the number of modulated symbols included in the HARQ transmission data packet.

Suppose the block interleaving scheme be adopted and the number of the columns of the block interleaver be $n_C$, we can determine the number of rows of the block interleaver as follows according to the HARQ transmission data packet:

$$n_R = \left\lceil \frac{n}{n_C} \right\rceil * m \tag{6}$$

Where: $n_R$ denotes the number of rows of the block interleaver; $n_C$ denotes the number of columns of the block interleaver; n denotes the number of bits included in HARQ transmission data packet.

Inputting the data bits in line into the bit interleaver: the data bit sequence is $X_i$ (i=0, 1, 2, ... N−1). Inputting $X_0$, $X_m$, $X_{2m}$, ..., $X_{(n_C-1)m}$ in turn into the bit interleaver as the first row, and $X_1$, $X_{m+1}$, $X_{2m+1}$, ..., $X_{(n_C-1)m+1}$ as the second row. By analogy, inputting $X_{m-1}$, $X_{2m-1}$, $X_{3m-1}$, ..., $X_{n_Cm-1}$ in turn into the bit interleaver as the mth row and inputting $X_{n_Cm}$, $X_{(n_C+1)m}$, $X_{(n_C+2)m}$, ..., $X_{(2n_C-1)m}$ in turn into the bit interleaver as the m+1 th row.

Given $X_i$, its location in the bit interleaver can be calculated with the formula below:

$$C_i = \mathrm{mod}\left(\left\lfloor \frac{i}{m} \right\rfloor, n_C\right) \tag{7}$$

$$R_i = \left\lfloor \frac{\left\lfloor \frac{i}{m} \right\rfloor}{n_C} \right\rfloor * m + \mathrm{mod}(i, m) \tag{8}$$

Where: i denotes the bit sequence number; $C_i$ denotes the column in which the data bit $X_i$ locates in the bit interleaver; $R_i$ denotes the row in which the data bit $X_i$ locates in the bit interleaver.

After all data bits are input into the bit interleaver according to the rules mentioned above, perform column permutation to them according to specific mode. The column permutation modes are different in the transmissions in HARQ process. Suppose the number of columns of the bit interleaver be $n_C$, and the maximum number of HARQ transmissions be $n_{max}$, we can determine the column permutation mode in the HARQ transmission j ($0 \leq j < n_{max}$) with the algorithm below:

---

Algorithm 1:

$$\mathrm{PInt} = \left\lfloor \frac{n_C}{n_{max}} \right\rfloor \times j$$

for i = 0 to $n_C$ − 1
    if no column permutation is done to the column I,
    k = mod(i + PInt, $n_C$)
        if no column permutation is done to column k,
        Permute column i with column k -continued

```
    else
            Permute column i with the first column which is
among the columns from column k + 1 to column n_C with no column
permutation and whose column number is not equal to i.
            end if
        end if
    end for
```

Finally, read out the data bits in column from the bit interleaver.

Figure 8:
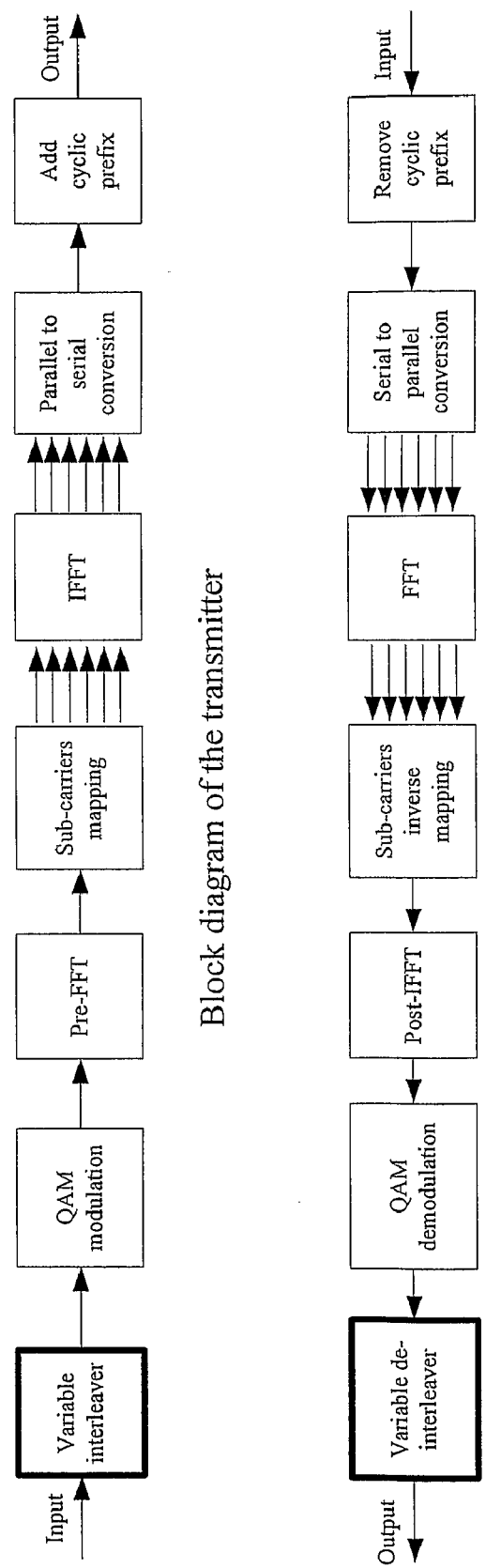

The above algorithm can be applied either in the multi-carrier communication system or in the SC-FDMA and the block diagram of the transmitter/receiver is shown in FIG. 8. Introducing the variable interleaver in which the above algorithm is applied into the transmitter. The output of the variable interleaver is input into the modulator.

Figure 9:
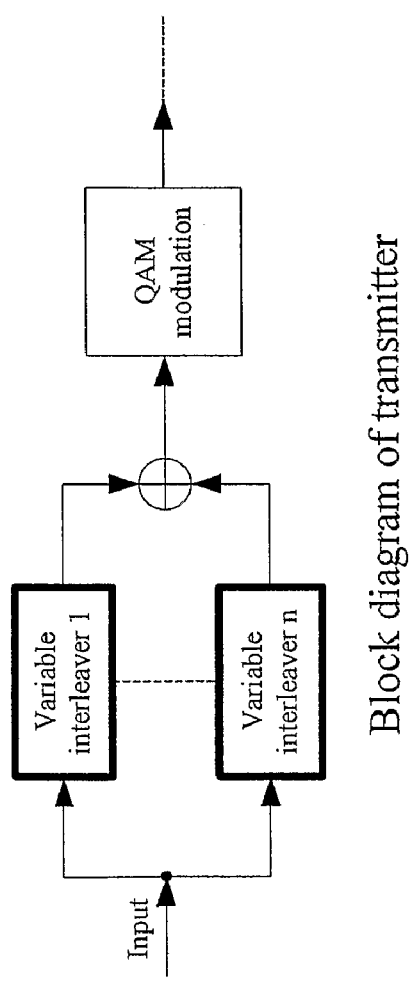
Figure 9:
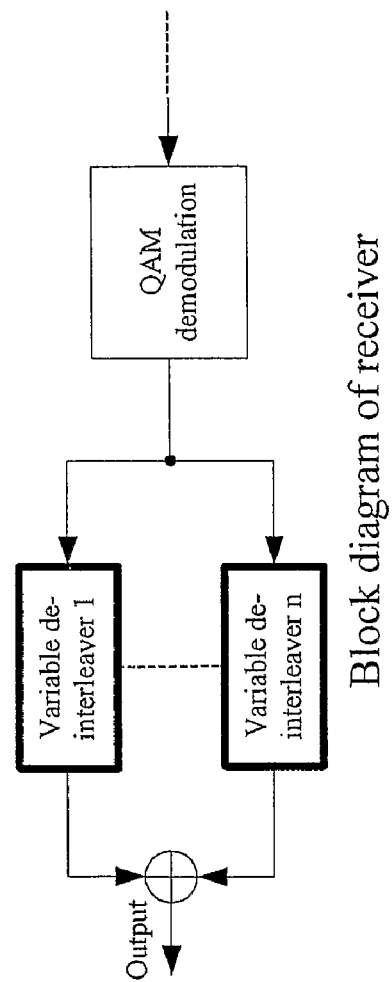

The above algorithm can also be applied in the transmitter with several interleavers and the block diagram of the transmitter/receiver is shown in FIG. 9. Implementing several variable interleavers with the above algorithm and the column permutation modes of the realized interleavers can be either different or consistent. Introducing the interleavers into the transmitter, which outputs are input into the modulator.

Suppose $n_C=8$, and the maximum number of HARQ transmissions be 3, then with the above algorithm, we can obtain the column permutation modes applied in HARQ transmissions. They are shown in table 1:

TABLE 1

| Column permutation modes applied in HARQ transmissions | |
| --- | --- |
| HARQ transmission | Column permutation mode |
| original transmission | 0, 1, 2, 3, 4, 5, 6, 7 |
| first retransmission | 2, 3, 0, 1, 6, 7, 4, 5 |
| second retransmission | 4, 5, 6, 7, 0, 1, 2, 3 |

Suppose the maximum number of HARQ transmissions be 3 and each transmitted data packet includes 10 modulated symbols, i.e., 40 data bits (16-QAM). During the transmission process, either the mapping relationship between the bits and the modulation symbols or the mapping relationship between the modulation symbols and the sub-carriers is kept invariable. Let the number of columns of the block interleaver C=8, then the column permutation modes adopted in HARQ transmissions are shown in table 1.

During the process of transmission, the locations of the above 40 data bits in the interleaver are listed in table 2, 3 and 4 respectively after they experience column permutations.

TABLE 2

Where the data bits locate in the interleaver after they experience column permutation (the original transmission)

| | column | | | | | | | | | | | | | | | |
| --- | --- | --- | --- | --- | --- | --- | --- | --- | --- | --- | --- | --- | --- | --- | --- | --- |
| | 0 | | 1 | | 2 | | 3 | | 4 | | 5 | | 6 | | 7 | |
| row | Bit | Sub carrier | Bit | Sub carrier | Bit | Sub carrier | Bit | Sub carrier | Bit | Sub carrier | Bit | Sub carrier | Bit | Sub carrier | Bit | Sub carrier |
| 0 | 0 | 1 | 4 | 3 | 8 | 5 | 12 | 6 | 16 | 7 | 20 | 8 | 24 | 9 | 28 | 10 |
| 1 | 1 | | 5 | | 9 | | 13 | | 17 | | 21 | | 25 | | 29 | |
| 2 | 2 | | 6 | | 10 | | 14 | | 18 | | 22 | | 26 | | 30 | |
| 3 | 3 | | 7 | | 11 | | 15 | | 19 | | 23 | | 27 | | 31 | |
| 4 | 32 | 2 | 36 | 4 | 0 | | 0 | | 0 | | 0 | | 0 | | 0 | |
| 5 | 33 | | 37 | | 0 | | 0 | | 0 | | 0 | | 0 | | 0 | |
| 6 | 34 | | 38 | | 0 | | 0 | | 0 | | 0 | | 0 | | 0 | |
| 7 | 35 | | 39 | | 0 | | 0 | | 0 | | 0 | | 0 | | 0 | |

TABLE 3

Where the data bits locate in the interleaver after they experience column permutation (the first retransmission)

| | column | | | | | | | | | | | | | | | |
| --- | --- | --- | --- | --- | --- | --- | --- | --- | --- | --- | --- | --- | --- | --- | --- | --- |
| | 0 | | 1 | | 2 | | 3 | | 4 | | 5 | | 6 | | 7 | |
| row | Bit | Sub carrier | Bit | Sub carrier | Bit | Sub carrier | Bit | Sub carrier | Bit | Sub carrier | Bit | Sub carrier | Bit | Sub carrier | Bit | Sub Carrier |
| 0 | 8 | 1 | 12 | 2 | 0 | 3 | 4 | 5 | 24 | 7 | 28 | 8 | 16 | 9 | 20 | 10 |
| 1 | 9 | | 13 | | 1 | | 5 | | 25 | | 29 | | 17 | | 21 | |
| 2 | 10 | | 14 | | 2 | | 6 | | 26 | | 30 | | 18 | | 22 | |
| 3 | 11 | | 15 | | 3 | | 7 | | 27 | | 31 | | 19 | | 23 | |
| 4 | 0 | | 0 | | 32 | 4 | 36 | 6 | 0 | | 0 | | 0 | | 0 | |
| 5 | 0 | | 0 | | 33 | | 37 | | 0 | | 0 | | 0 | | 0 | |
| 6 | 0 | | 0 | | 34 | | 38 | | 0 | | 0 | | 0 | | 0 | |
| 7 | 0 | | 0 | | 35 | | 39 | | 0 | | 0 | | 0 | | 0 | |

TABLE 4

Where the data bits locate in the interleaver after they experience
column permutation (the second retransmission)

| | column 0 | | column 1 | | column 2 | | column 3 | | column 4 | | column 5 | | column 6 | | column 7 | |
|---|---|---|---|---|---|---|---|---|---|---|---|---|---|---|---|---|
| row | bit | Sub carrier | bit | Sub carrier | bit | Sub carrier | bit | Sub carrier | bit | Sub carrier | bit | Sub carrier | bit | Sub carrier | bit | Sub Carrier |
| 0 | 16 | 1 | 20 | 2 | 24 | 3 | 28 | 4 | 0 | 5 | 4 | 7 | 8 | 9 | 12 | 10 |
| 1 | 17 | | 21 | | 25 | | 29 | | 1 | | 5 | | 9 | | 13 | |
| 2 | 18 | | 22 | | 26 | | 30 | | 2 | | 6 | | 10 | | 14 | |
| 3 | 19 | | 23 | | 27 | | 31 | | 3 | | 7 | | 11 | | 15 | |
| 4 | 0 | | 0 | | 0 | | 0 | | 32 | 6 | 36 | 8 | 0 | | 0 | |
| 5 | 0 | | 0 | | 0 | | 0 | | 33 | | 37 | | 0 | | 0 | |
| 6 | 0 | | 0 | | 0 | | 0 | | 34 | | 38 | | 0 | | 0 | |
| 7 | 0 | | 0 | | 0 | | 0 | | 35 | | 39 | | 0 | | 0 | |

The sub-carriers used to transmit the above 40 data bits in the transmission process are listed in table 5.

TABLE 5

Sub-carriers used to transmit data bits in the transmission process

| bit sequence number | sub-carrier sequence number | | | |
|---|---|---|---|---|
| | original transmission | first retransmission | second retransmission | sub-carrier average interval |
| 0 | 1 | 2 | 3 | 1 | 3 | 5 | 8/3 |
| 4 | 5 | 6 | 7 | 3 | 5 | 7 | 8/3 |
| 8 | 9 | 10 | 11 | 5 | 1 | 9 | 16/3 |
| 12 | 13 | 14 | 15 | 6 | 2 | 10 | 16/3 |
| 16 | 17 | 18 | 19 | 7 | 9 | 1 | 16/3 |
| 20 | 21 | 22 | 23 | 8 | 10 | 2 | 16/3 |
| 24 | 25 | 26 | 27 | 9 | 7 | 3 | 12/3 |
| 28 | 29 | 30 | 31 | 10 | 8 | 4 | 12/3 |
| 32 | 33 | 34 | 35 | 2 | 4 | 6 | 8/3 |
| 36 | 37 | 38 | 39 | 4 | 6 | 8 | 8/3 |

As shown in table 1, the average intervals between the sub-carriers which are used to transmit the data bits with the sequence number 8 through 31 are comparatively longer, and more frequency gains are obtained here. The locations of the bits bear high priority and are used to transmit data bits with high priority. The average intervals between the sub-carriers which are used to transmit the data bits with the sequence number 0 through 7 and 32 through 39 are comparatively shorter. And the locations of the data bits bear low priority.

For the adopted HARQ mechanism, following bit transmission methods are introduced in:

1) Chase Combined HARQ
   Transmit the system bits in the bit locations 17 through 40 in turn, and the rest bit locations are used to transmit parity bits.
2) Partly Incremental Redundancy HARQ
   Transmit the system bits in the bit locations 17 through 40 in turn. Next, transmit the same parity bits in the rest bit locations within 17 through 40 and in the bit locations 1 through 16 in turn. Finally, transmit the different parity bits in the rest bit locations in turn.
3) Fully incremental redundancy HARQ
   Transmit the system bits in the bit locations 17 through 40 in turn. Next, transmit the same parity bits in the rest bit locations within 17 through 40 and in the bit locations 1 through 16 in turn. Finally, transmit the different parity bits in the rest bit locations in turn.

Embodiment 2

Different bit interleaving schemes are applied in different HARQ transmissions. The bit interleaving scheme can change the mapping relationship between the bits and the modulation symbols.

A HARQ transmission data packet includes N bits:

$$N = m \times n \quad (9)$$

Where: m denotes the number of bits included in each modulated symbol; n denotes the number of modulated symbols included in the HARQ transmission data packet.

Suppose the block interleaving scheme be adopted here and the number of the columns of the block interleaver be C, we can determine the number of rows in the block interleaver as follows according to the HARQ transmission data packet:

$$R = \left\lceil \frac{N}{C} \right\rceil \quad (10)$$

Where: R denotes the number of rows in the block interleaver; C denotes the number of columns in the block interleaver; N denotes the number of bits included in HARQ transmission data packet.

Input the data bits in line into the bit interleaver: the bit sequence is $X_i$ (i=0, 1, 2, ... N−1). Given $X_i$, its location in the bit interleaver can be calculated with the formula below:

$$C_i = \mathrm{mod}(i, C) \quad (11)$$

$$R_i = \left\lfloor \frac{i}{C} \right\rfloor \quad (12)$$

Where: $C_i$ denotes the column in which the data bit $X_i$ locates in the bit interleaver; $R_i$ denotes the row in which the data bit $X_i$ locates in the bit interleaver.

After all data bits are input into the bit interleaver according to the rules mentioned above, performing column permutation on them according to specific mode. The column permutation modes are different in the transmissions in the HARQ process. Suppose the number of columns of the bit interleaver be $n_C$, and the maximum number of HARQ transmissions be $n_{max}$, we can determine the column permutation mode in the HARQ transmission j ($0 \leq j < n_{max}$) with the algorithm below:

Algorithm 1:

$$PInt = \left\lfloor \frac{n_C}{n_{max}} \right\rfloor \times j$$

for i = 0 to $n_C - 1$
   if no column permutation is done to colunm i
      k = mod(i + PInt, $n_C$)
      if no column permutation is done to colunm k
         Permute column i with column k
   else
         Permute column i with the first column which is among the columns from column k + 1 to column $n_C$ with no column permutation and whose column number is not equal to i.
      end if
   end if
end for Finally, read out the data bits in column from the bit interleaver.

The above algorithm can be applied either in the multi-carrier communication system or in the SC-FDMA and the block diagram of the transmitter/receiver is shown in FIG. 8.

Introduce the variable interleaver in which the above algorithm is applied into the transmitter. The output of the variable interleaver is input into the modulator.

The above algorithm can also be applied in the transmitter with several interleavers and the block diagram of the transmitter/receiver is shown in FIG. 9. Implement several variable interleavers with the above algorithm and the column permutation modes of the realized interleavers can be either different or consistent. Introduce the interleavers (whose outputs are input into the modulator) into the transmitter.

Suppose the maximum number of HARQ transmissions be 3 and each is transmitted data packet includes 10 modulated symbols, i.e., 40 data bits (16-QAM). During the transmission process, the mapping relationship between the bits and the modulation symbols may be variable but the mapping relationship between the modulation symbols and the subcarriers must be kept invariable. Let the number of columns of the block interleaver C=8 then the column permutation modes adopted in HARQ transmissions are shown in table 1. During the process of transmission, the locations of the above 40 data bits in the interleaver are listed in table 6, 7 and 8 respectively after they experience column permutations.

TABLE 6

Where the data bits locate in the interleaver after they experience column permutation (the original transmission)

| | column | | | | | | | | | | | | | | | |
|---|---|---|---|---|---|---|---|---|---|---|---|---|---|---|---|---|
| | 0 | | 1 | | 2 | | 3 | | 4 | | 5 | | 6 | | 7 | |
| row | bit | sub carrier | bit | sub carrier | bit | sub carrier | bit | sub carrier | bit | sub carrier | bit | sub carrier | bit | sub carrier | bit | sub carrier |
| 0 | 0 | 1 | 1 | 2 | 2 | 3 | 3 | 4 | 4 | 6 | 5 | 7 | 6 | 8 | 7 | 9 |
| 1 | 8 | 1 | 9 | 2 | 10 | 3 | 11 | 5 | 12 | 6 | 13 | 7 | 14 | 8 | 15 | 10 |
| 2 | 16 | 1 | 17 | 2 | 18 | 4 | 19 | 5 | 20 | 6 | 21 | 7 | 22 | 9 | 23 | 10 |
| 3 | 24 | 1 | 25 | 3 | 26 | 4 | 27 | 5 | 28 | 6 | 29 | 8 | 30 | 9 | 31 | 10 |
| 4 | 32 | 2 | 33 | 3 | 34 | 4 | 35 | 5 | 36 | 7 | 37 | 8 | 38 | 9 | 39 | 10 |

TABLE 7

Where the data bits locate in the interleaver after they experience column permutation (the first retransmission)

| | column | | | | | | | | | | | | | | | |
|---|---|---|---|---|---|---|---|---|---|---|---|---|---|---|---|---|
| | 0 | | 1 | | 2 | | 3 | | 4 | | 5 | | 6 | | 7 | |
| row | bit | sub carrier | bit | sub carrier | bit | sub carrier | bit | sub carrier | bit | sub carrier | bit | sub carrier | bit | sub carrier | bit | sub carrier |
| 0 | 2 | 1 | 3 | 2 | 0 | 3 | 1 | 4 | 6 | 6 | 7 | 7 | 4 | 8 | 5 | 9 |
| 1 | 10 | 1 | 11 | 2 | 8 | 3 | 9 | 5 | 14 | 6 | 15 | 7 | 12 | 8 | 13 | 10 |
| 2 | 18 | 1 | 19 | 2 | 16 | 4 | 17 | 5 | 22 | 6 | 23 | 7 | 20 | 9 | 21 | 10 |
| 3 | 26 | 1 | 27 | 3 | 24 | 4 | 25 | 5 | 30 | 6 | 31 | 8 | 28 | 9 | 29 | 10 |
| 4 | 34 | 2 | 35 | 3 | 32 | 4 | 33 | 5 | 38 | 7 | 39 | 8 | 36 | 9 | 37 | 10 |

TABLE 8

Where the data bits locate in the interleaver after they experience column permutation (the second retransmission)

| | column | | | | | | | | | | | | | | | |
|---|---|---|---|---|---|---|---|---|---|---|---|---|---|---|---|---|
| | 0 | | 1 | | 2 | | 3 | | 4 | | 5 | | 6 | | 7 | |
| row | bit | sub carrier | bit | sub carrier | bit | sub carrier | bit | sub carrier | bit | sub carrier | bit | sub carrier | bit | sub carrier | bit | sub carrier |
| 0 | 4 | 1 | 5 | 2 | 6 | 3 | 7 | 4 | 0 | 6 | 1 | 7 | 2 | 8 | 3 | 9 |
| 1 | 12 | 1 | 13 | 2 | 14 | 3 | 15 | 5 | 8 | 6 | 9 | 7 | 10 | 8 | 11 | 10 |

TABLE 8-continued

Where the data bits locate in the interleaver after they experience column permutation (the second retransmission)

| | | | | | | | column | | | | | | | | | |
|---|---|---|---|---|---|---|---|---|---|---|---|---|---|---|---|---|
| | | 0 | | 1 | | 2 | | 3 | | 4 | | 5 | | 6 | | 7 |
| row | bit | sub carrier | bit | sub carrier | bit | sub carrier | bit | sub carrier | bit | sub carrier | bit | sub carrier | bit | sub carrier | bit | sub carrier |
| 2 | 20 | 1 | 21 | 2 | 22 | 4 | 23 | 5 | 16 | 6 | 17 | 7 | 18 | 9 | 19 | 10 |
| 3 | 28 | 1 | 29 | 3 | 30 | 4 | 31 | 5 | 24 | 6 | 25 | 8 | 26 | 9 | 27 | 10 |
| 4 | 36 | 2 | 37 | 3 | 38 | 4 | 39 | 5 | 32 | 7 | 33 | 8 | 34 | 9 | 35 | 10 |

The sub-carriers used to transmit the above 40 data bits in the transmission process are listed in table 9.

TABLE 9

Sub-carriers used to transmit data bits in the transmission process

| bit sequence number | the original transmission | the first retransmission | the second retransmission | sub-carrier average interval |
|---|---|---|---|---|
| 0 | 1 | 3 | 6 | 10/3 |
| 1 | 2 | 4 | 7 | 10/3 |
| 2 | 3 | 1 | 8 | 14/3 |
| 3 | 4 | 2 | 9 | 14/3 |
| 4 | 6 | 8 | 1 | 14/3 |
| 5 | 7 | 9 | 2 | 14/3 |
| 6 | 8 | 6 | 3 | 10/3 |
| 7 | 9 | 7 | 4 | 10/3 |
| 8 | 1 | 3 | 6 | 10/3 |
| 9 | 2 | 5 | 7 | 10/3 |
| 10 | 3 | 1 | 8 | 14/3 |
| 11 | 5 | 2 | 10 | 16/3 |
| 12 | 6 | 8 | 1 | 14/3 |
| 13 | 7 | 10 | 2 | 16/3 |
| 14 | 8 | 6 | 3 | 10/3 |
| 15 | 10 | 7 | 5 | 10/3 |
| 16 | 1 | 4 | 6 | 10/3 |
| 17 | 2 | 5 | 7 | 10/3 |
| 18 | 4 | 1 | 9 | 16/3 |
| 19 | 5 | 2 | 10 | 16/3 |
| 20 | 6 | 9 | 1 | 16/3 |
| 21 | 7 | 10 | 2 | 16/3 |
| 22 | 9 | 6 | 4 | 10/3 |
| 23 | 10 | 7 | 5 | 10/3 |
| 24 | 1 | 4 | 6 | 10/3 |
| 25 | 3 | 5 | 8 | 10/3 |
| 26 | 4 | 1 | 9 | 16/3 |
| 27 | 5 | 3 | 10 | 14/3 |
| 28 | 6 | 9 | 1 | 16/3 |
| 29 | 8 | 10 | 3 | 14/3 |
| 30 | 9 | 6 | 4 | 10/3 |
| 31 | 10 | 8 | 5 | 10/3 |
| 32 | 2 | 4 | 7 | 10/3 |
| 33 | 3 | 5 | 8 | 10/3 |
| 34 | 4 | 2 | 9 | 14/3 |
| 35 | 5 | 3 | 10 | 14/3 |
| 36 | 7 | 9 | 2 | 14/3 |
| 37 | 8 | 10 | 3 | 14/3 |
| 38 | 9 | 7 | 4 | 10/3 |
| 39 | 10 | 8 | 5 | 10/3 |

As shown in table 2, the locations with the bit number 2~5, 10~13, 18~21, 26~29, 34~37 bear high priority and are preferentially used to transmit data bits with high priority. The locations with the bit number 0, 1, 6~9, 14~17, 22~25, 30~33, 38 and 39 bear low priority and are used to transmit the rest data.

Embodiment 3

Figure 10:
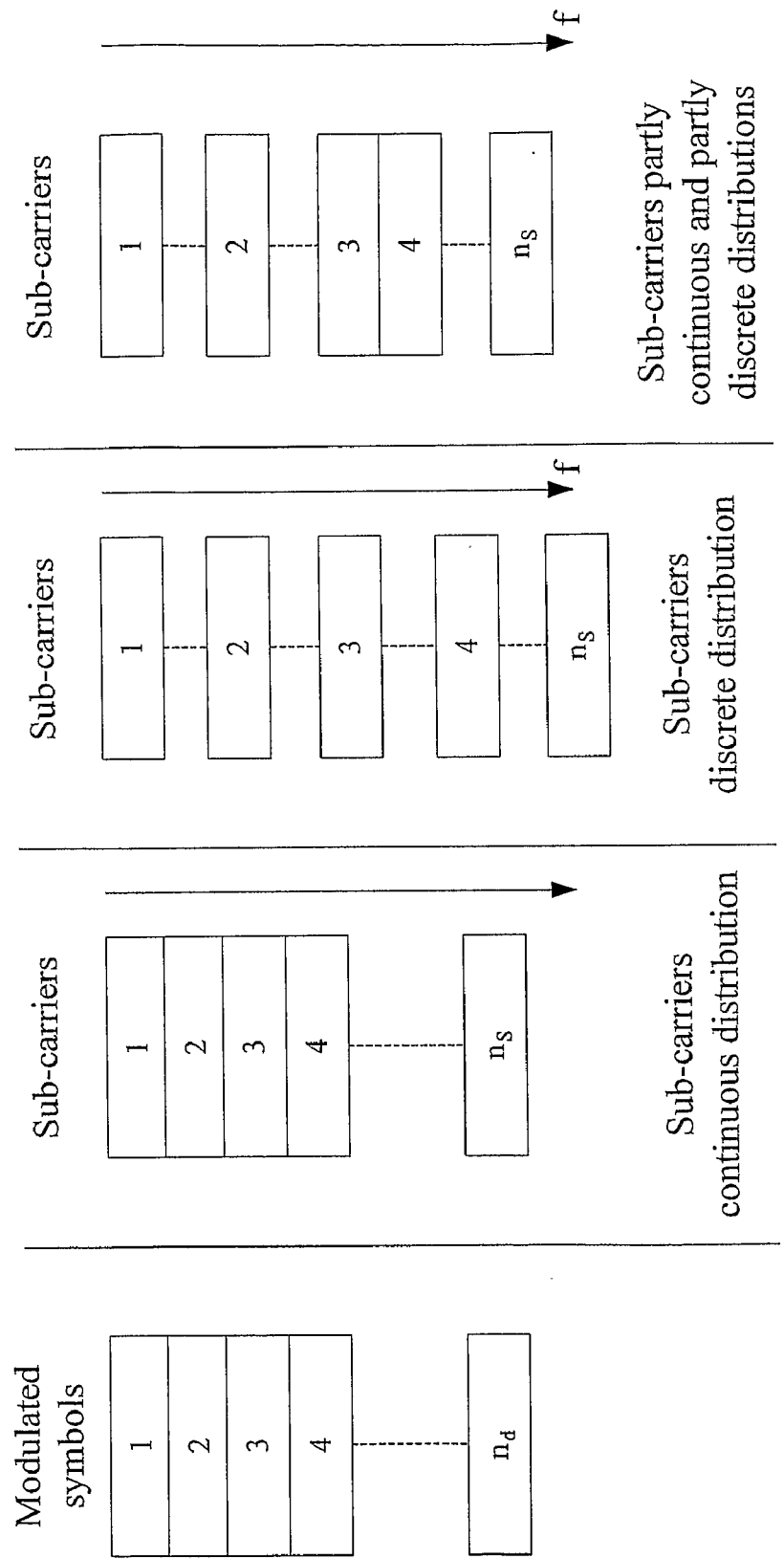
FIG. 10 is a schematic diagram illustrating the sub-carriers' frequency domain distribution.

Given that the number of modulated symbols included in the HARQ transmission data packet be $n_d$ corresponding to $n_S$ sub-carriers, i.e., $n_d=n_S$. These $n_S$ sub-carriers may be either continuous or discrete, or partly continuous & partly discrete in frequency domain, as shown in FIG. 10. The maximum number of HARQ transmissions is $n_{max}$. With the algorithm below, we can obtain each sub-carrier corresponding to each modulation symbol in HARQ transmission j ($0 \leq j < n_{max}$):

$$k = \mod\left(i + \left\lfloor \frac{n_s}{n_{max}} \right\rfloor \times j, n_s\right) \quad (13)$$

$$(0 \leq j < n_{max})$$

Where: k ($0 \leq k < n_S$) denotes the sequence number of the sub-carriers; i ($0 \leq i < n_d$) denotes the sequence number of the modulation symbols; $n_d$ denotes the number of the modulation symbols included in HARQ transmitted data packet; $n_S$ denotes the number of sub-carriers adopted in HARQ data transmission; $n_{max}$ denotes the maximum number of HARQ transmissions; j ($0 \leq j < n_{max}$) denotes the number of HARQ transmissions.

The above algorithm can be applied in the SC-FDMA system. The block diagram of the transmitter/receiver is shown in FIG. 8 and two approaches are available for this application.

Figure 11:
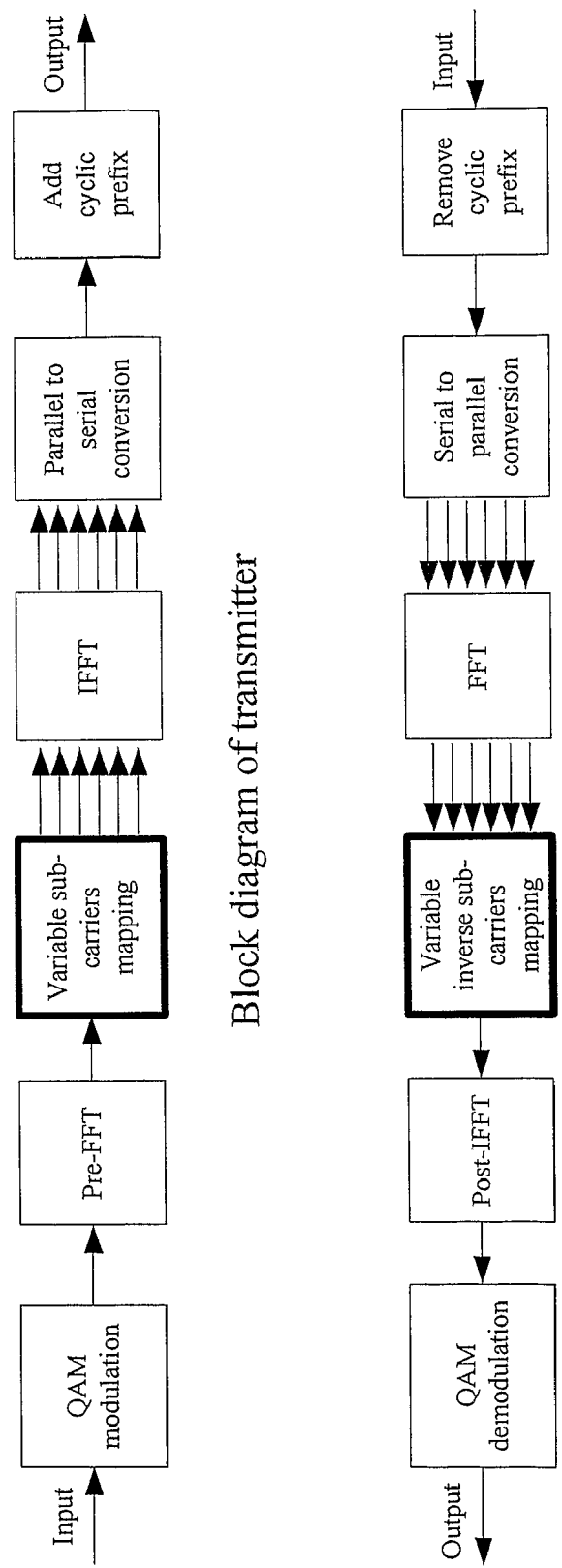
FIG. 11 is a block diagram illustrating the SC-FDMA transmitter/receiver in which scheme 3 is applied (mode 1)

Approach 1:

As shown in FIG. 11, introducing the variable sub-carrier mapping module which is implemented with the above algorithm into the transmitter. The output of the Pre-FFT module is input into the variable sub-carrier mapping module, whose output is input into the IFFT module.

Figure 12:
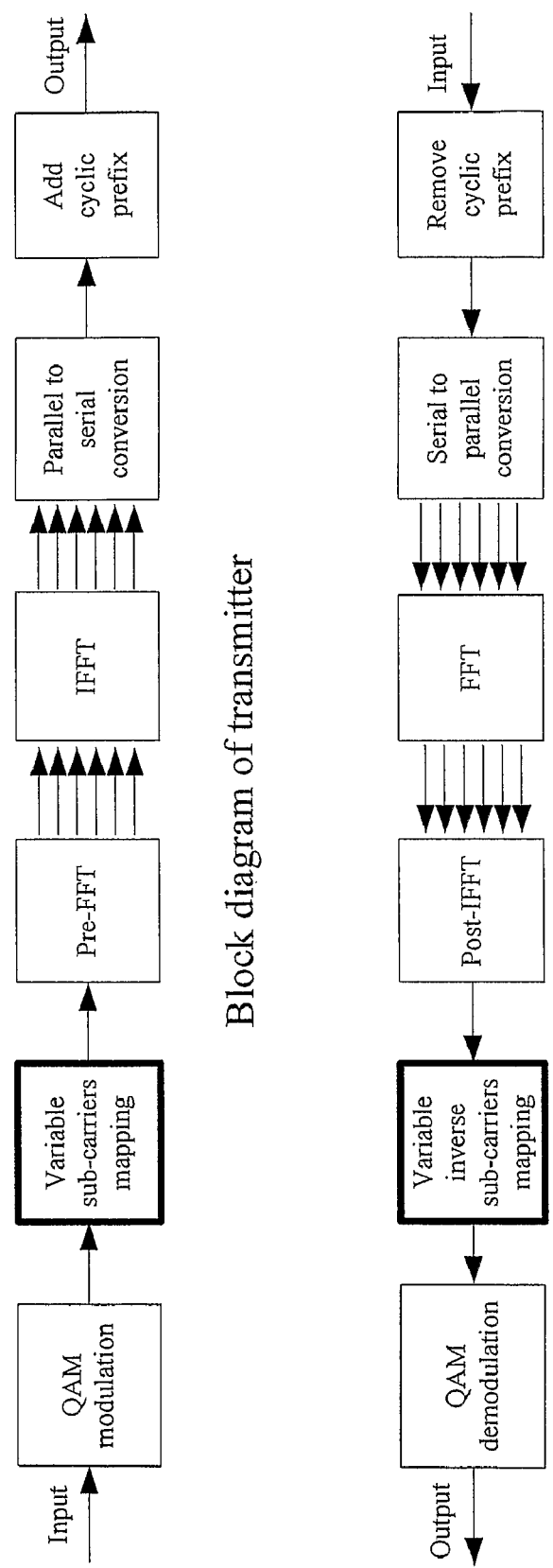
FIG. 12 is a block diagram illustrating the SC-FDMA transmitter/receiver in which scheme 3 is applied (mode 2)

Approach 2:

As shown in FIG. 12, introducing the variable sub-carrier mapping module which is implemented with the above algorithm into the transmitter. The output of the QAM modulation module is input into the variable sub-carrier mapping module, whose output is input into the Pre-FFT module.

Given that the maximum number of HARQ transmissions is 3, each transmitted data packet includes 12 symbols corresponding to 12 sub-carriers numbering from 1 to 12. These 12 sub-carriers are either continuous or discrete or even variable (frequency hopping) in the frequency domain. During the process of transmission, keep the bit interleaving scheme unchanged. And the mapping relationships between the modulation symbols and the sub-carriers are shown in table 4. The sub-carriers adopted to transmit the above 12 symbols during the transmission process are listed in table 3.

TABLE 10

Symbol-to-sub-carrier mapping relationships in HARQ transmissions

| modulation symbol sequence number | sub-carrier sequence number | | | sub-carrier the average interval |
|---|---|---|---|---|
| | the original transmission | the first retransmission | the second retransmission | |
| 0 | 0 | 4 | 8 | 16/3 |
| 1 | 1 | 5 | 9 | 16/3 |
| 2 | 2 | 6 | 10 | 16/3 |
| 3 | 3 | 7 | 11 | 16/3 |
| 4 | 4 | 8 | 0 | 16/3 |
| 5 | 5 | 9 | 1 | 16/3 |
| 6 | 6 | 10 | 2 | 16/3 |
| 7 | 7 | 11 | 3 | 16/3 |
| 8 | 8 | 0 | 4 | 16/3 |
| 9 | 9 | 1 | 5 | 16/3 |
| 10 | 10 | 2 | 6 | 16/3 |
| 11 | 11 | 3 | 7 | 16/3 |

Embodiment 4

In the transmitting end, several sub-bands are adopted to transmit data. The sub-bands with better channel conditions are adopted to transmit bits (such as the system bits) with comparatively higher priority and the sub-bands with worse channel conditions are adopted to transmit bits (such as the parity bits) with comparatively lower priority. In addition, in order to obtain better effect of frequency diversity, a variable bit interleaver/de-interleaver (or several interleavers/de-interleavers are adopted for data streams with different priorities) is introduced into the transmitting/receiving end. During the process of automatic retransmission request transmission, settings on bit priority can be either invariable or variable.

Figure 13:
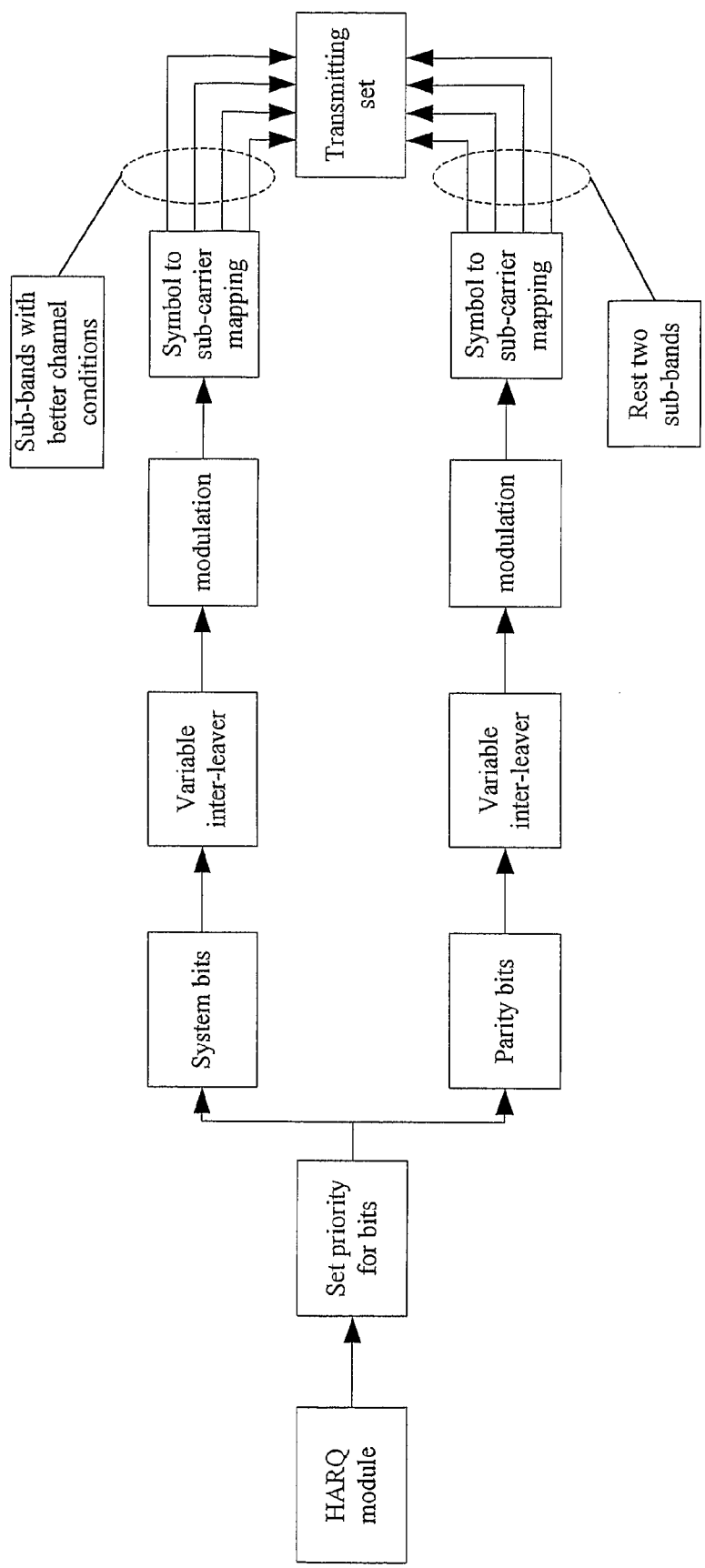
FIG. 13 illustrates a structure of the transmitting device in the case that several sub-bands and several variable bit inter-leavers are adopted in the system.

It is assumed that two priorities have been set for data. Two variable bit interleavers are adopted here and data is transmitted in virtue of three sub-bands. The structure of the transmitting device is shown in FIG. 13. With the variable bit interleavers applied in the transmission process, the system bits are transmitted via different sub-carriers within the allocated sub-bands and the parity bits are transmitted via different sub-carriers within the allocated sub-bands.

Embodiment 5

In the transmitting end, several sub-bands are adopted to transmit data. The sub-bands with better channel conditions are adopted to transmit bits (such as the system bits) with comparatively higher priority and the sub-bands with worse channel conditions are adopted to transmit bits (such as the parity bits) with comparatively lower priority. Several variable symbol-to-sub-carrier mapper (variable symbol interleaver) are adopted in the transmitting/receiving end for data with different priorities. During the process of automatic retransmission request transmission, settings on bit priority can be either invariable or variable.

Figure 14:
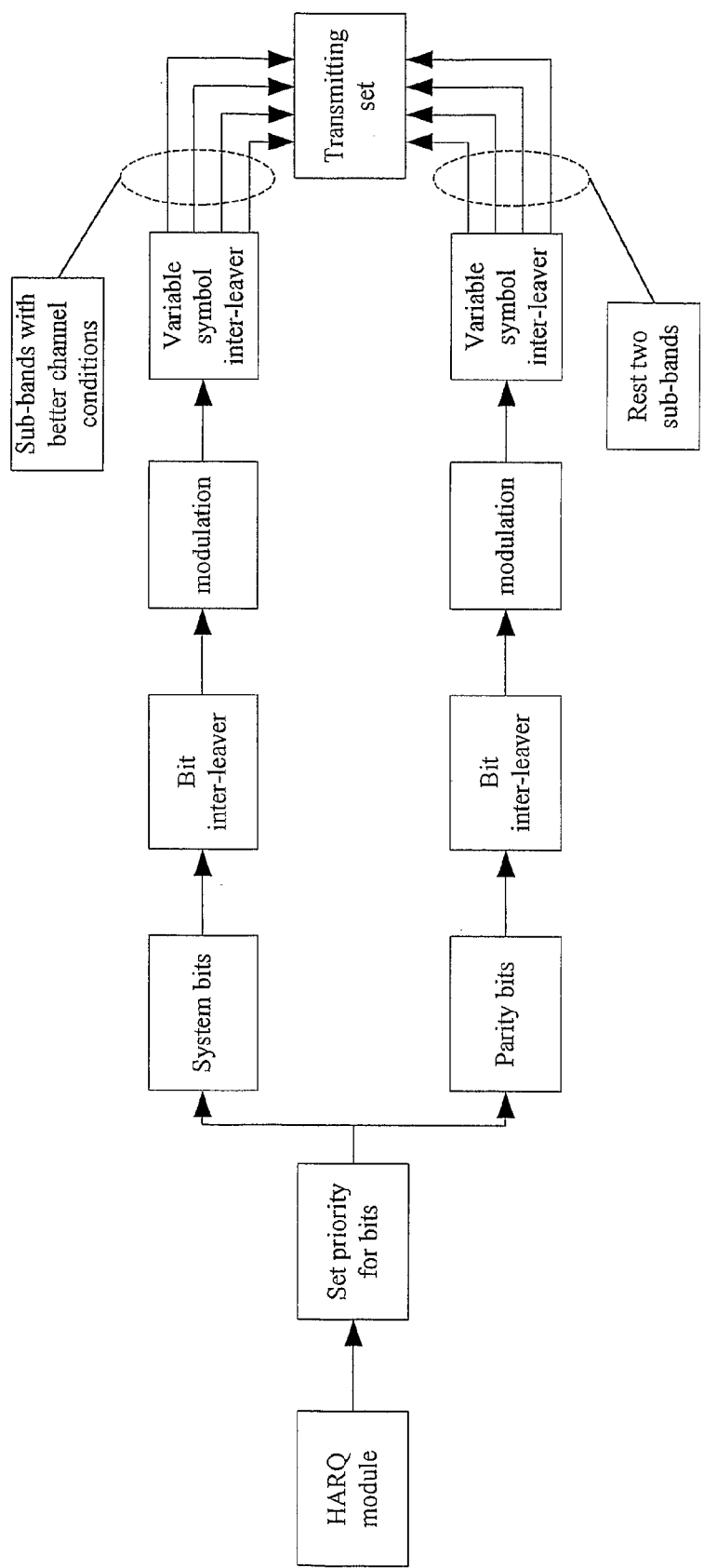
FIG. 14 illustrates a structure of the transmitting device in the case that several sub-bands and several variable modulation symbol interleavers are adopted in the system.

It is assumed that two priorities have been set for data. Two variable symbol interleavers are adopted here and data is transmitted in virtue of three sub-bands. The structure of the transmitting device is shown in FIG. 14. Variable symbol interleavers are adopted for the system bit symbol sequence. During the process of implementation, the same system bit should be transmitted via different sub-carriers within the relevant sub-band. Variable symbol interleavers are adopted for the parity bit symbol sequence. And during the process of implementation, the same parity bit should be transmitted via different sub-carriers within the relevant sub-band.

Embodiment 6

The Symbol Mapping based on Priority (SMP) is adopted in the transmitting end. In the light of the modulation scheme, map the data bits (e.g., the system bits) with high priority to the bit locations with high reliability, and map the data bits (e.g., the parity bits) with low priority to the bit locations with low reliability. In addition, to gain better effect of frequency diversity, a variable bit interleaver (or several interleavers are adopted for data streams with different priorities) is introduced into the transmitting end. During the process of automatic retransmission request transmission, settings on bit priority can be either invariable or variable.

Figure 15:
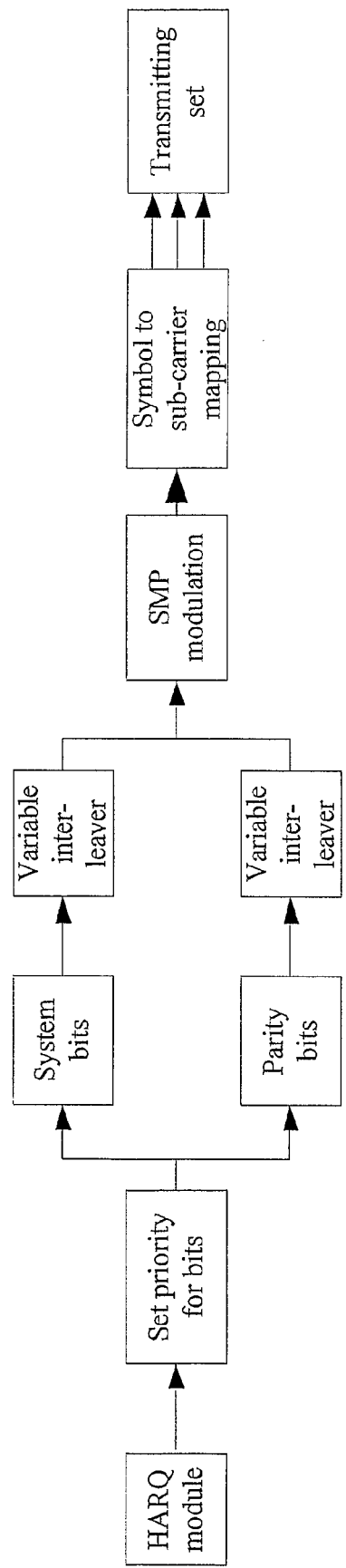
FIG. 15 illustrates a structure of the transmitting device in the case that the SMP modulation scheme and two variable bit inter-leavers are adopted in the system for data transmission.

It is assumed that two priorities have been set for data. Two variable bit interleavers are adopted here. The structure of the transmitting device is shown in FIG. 15. With the variable bit interleavers applied in the transmission process, the same system bit is mapped to different modulated symbols with high reliability and transmitted via different sub-carriers; the same parity bit is mapped to different modulated symbols with low reliability and transmitted via different sub-carriers.

Embodiment 7

The Symbol Mapping based on Priority (SMP) is adopted in the transmitting end. In the light of the modulation scheme, map the data bits (e.g., the system bits) with high priority into the bit locations with high reliability, and map the data bits (e.g., the parity bits) with low priority into the bit locations with low reliability. In addition, in order to obtain better effect of frequency diversity, a variable symbol interleaver is introduced into the transmitting end. During the process of automatic retransmission request transmission, settings on bit priority can be either invariable or variable.

Figure 16:
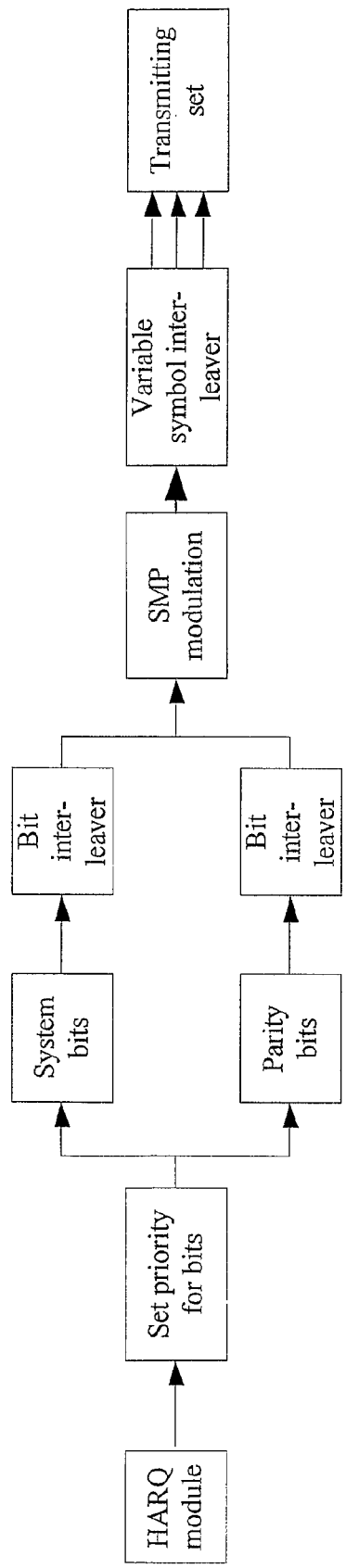
FIG. 16 illustrates a structure of the transmitting device in the case that the SMP modulation scheme and a single variable modulation symbol inter-leaver are adopted in the system.

It is assumed that two priorities have been set for data. One variable symbol interleaver is adopted here. The structure of the transmitting device is shown in FIG. 16. With the variable symbol interleaver applied in the transmission process, the same system bit is mapped to the same modulated symbol with high reliability and transmitted via different sub-carriers; the same parity bit is mapped to the same modulated symbol with low reliability and transmitted via different sub-carriers.

Embodiment 8

In the SC-FDMA system, performance can be improved by combining the symbols (which bear the same contents as CP) in some locations in the data block with the cyclic prefix (CP). These modulation symbols bear high correct demodulation probability. Data bits with comparatively higher priority can be mapped to the symbols in the transmitting end. In addition, to gain better effect of frequency diversity, several variable bit interleavers are adopted in the transmitting end. During the process of automatic retransmission request transmission, settings on bit priority can be either invariable or variable.

Figure 17:
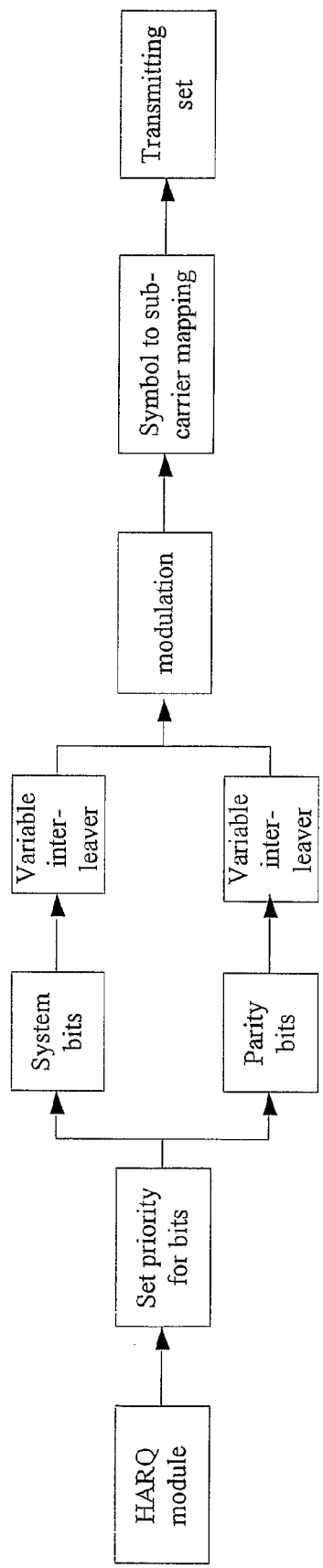
FIG. 17 illustrates a process that data bits with high priority are transmitted through the modulation symbols with high reliability.

It is assumed that two priorities have been set for data. Two variable bit interleavers are adopted here. The structure of the transmitting device is shown in FIG. 17. Here, the modulation module is responsible for data modulation and adjusting the symbol including the system bits to specific location. With the variable bit interleavers and the modulation module adopted in the transmission process, the same system bit is mapped to different modulation symbols with high reliability and transmitted via different sub-carriers; and the same parity bit is mapped to different modulation symbols and transmitted via different sub-carriers.

A transmission method with variable sub-carrier mapping mechanism is proposed in the present invention for the multi-carrier communication system in which HARQ is applied. Detailed implementation approach and regulations are offered. The present invention bears following effects:

1) The bit interleaving schemes applied in the transmission process are default to the base station and UEs. No extra signaling overhead is needed. The performance introduced from this invention will not suffered from the transmission error of signaling in the physical layer.

2) The symbol-to-sub-carrier mapping methods adopted in the transmission process are default to the base station and UEs. No extra signaling overhead is needed. The performance introduced from this invention will not suffered from the transmission error of signaling in the physical layer.

3) During the HARQ transmission process, the same bit is transmitted via different sub-carriers to achieve the frequency diversity gain. And the probability of failure of HARQ transmission caused by that some bits are always transmitted via the sub-carrier with the same deep fading is reduced. The average number of HARQ transmissions is reduced and the average delay is reduced also so that the system throughput is improved.

4) In the HARQ transmission process, different bit interleaving schemes are applied and very superior adaptability gains here, for the bit-to-symbol mapping relationship can be kept invariable or variable.

5) Priorities are specified for bit locations according to the average intervals between the sub-carriers adopted in the transmission process for the transmission of data bits with different priorities. Better frequency diversity effect is obtained to the data bits with high priority in the transmission process so as to reduce the average number of HARQ transmission and reduce the average delay to gain improvement in system throughput.

6) Priorities are specified for symbol locations according to the average intervals between the sub-carriers adopted in the transmission process for the transmission of data bits with different priorities. Better frequency diversity effect is obtained to the data bits with high priority in the transmission process so as to reduce the average number of HARQ transmission and reduce the average delay to gain improvement in system throughput.

7) The present invention is widely used in either continuous multi-carrier communication system, or discrete multi-carrier communication system or frequency hopping multi-carrier communication system. And it can be suitable for all sorts of HARQ mechanisms, it is also suitable for the SC-FDMA single-carrier communication system.

What is claimed is:

1. A variable sub-carrier mapping method comprising the steps of:
  applying different bit interleaving schemes to different retransmissions in a side of a transmitter for an automatic retransmission request; and
  in the side of the transmitter, modulating symbols onto sub-carriers for transmitting,
  wherein priorities are specified for bit locations according to bit interleaving schemes applied in a transmission process, and
  wherein a bit bears a higher priority if an average interval between sub-carriers adopted for the bit's transmission in the transmission process is longer and the bit bears a lower priority if the average interval between the sub-carriers adopted for the bit's transmission in the transmission process is shorter.

2. The method according to claim 1, wherein different bit interleaving schemes are applied in different HARQ transmissions.

3. The method according to claim 1, wherein during a retransmission process, a bit interleaver keeps a bit-to-symbol mapping relationship invariable.

4. The method according to claim 1, wherein during a retransmission process, a bit interleaver changes a bit-to-symbol mapping relationship.

5. The method according to claim 1, wherein a bit location with highest priority is used to transmit data bit with a highest priority, bit locations with higher priorities are used to transmit data bits with higher priorities, and bit locations with lower priorities are used to transmit remaining data bits.

6. The method according to claim 1, wherein in frequency domain, the sub-carriers are continuous, discrete or partly continuous and partly discrete.

7. The method according to claim 1, wherein a plurality of variable bit interleavers are adopted for data bits with different priority levels.

8. The method according to claim 1, wherein a plurality of variable bit interleavers are adopted for different sub-bands.

9. The method according to claim 1, wherein settings of a bit's priority are variable in a HARQ transmission process.

10. The method according to claim 1, wherein a number of rows is determined for the interleaver using:

$$n_R = \left\lceil \frac{n}{n_C} \right\rceil * m$$

Where: $n_R$ denotes a number of rows in a block interleaver; $n_C$ denotes a number of columns in the block interleaver; n denotes a number of bits included in each HARQ transmission data packet; and m denotes a number of bits included in each modulated symbol.

11. The method according to claim 1, wherein a column location where a bit locates after it is input into an interleaver is determined according to:

$$C_i = \mathrm{mod}\left(\left\lfloor \frac{i}{m} \right\rfloor, n_C\right)$$

Where: i denotes a bit sequence number; m denotes a number of bits included in each modulation symbol; $n_C$ denotes a number of columns in a block interleaver; and $C_i$ denotes a column in which data bit $X_i$ locates after it is input into the interleaver.

12. The method according to claim 1, wherein a row location where a bit locates after it is input into an interleaver is determined according to:

$$R_i = \left\lfloor \frac{\left\lfloor \frac{i}{m} \right\rfloor}{n_C} \right\rfloor * m + \mathrm{mod}(i, m)$$

Where: i denotes a bit sequence number; m denotes a number of bits included in each modulation symbol; and $R_i$ denotes a row in which data bit $X_i$ locates after it is input into the interleaver.

13. A variable sub-carrier mapping method comprising the steps of:
  in a side of transmitter, applying different symbol-to-sub-carrier mapping schemes to retransmissions for an automatic retransmission request; and
  in the side of the transmitter, modulating symbols onto sub-carriers for transmitting,
  wherein priorities are specified for symbol locations according to symbol-to-sub-carrier mapping schemes applied in a transmission process, and
  wherein a modulated symbol bears a higher priority if an average interval between sub-carriers adopted for the symbol's transmission in the transmission process is longer, and the modulated symbol bears a lower priority if the average interval between the sub-carriers adopted for the symbol's transmission in the transmission process is shorter.

14. The method according to claim 13, wherein different symbol-to-sub-carrier mapping schemes are applied in different HARQ transmissions.

15. The method according to claim 13, wherein a symbol location with a highest priority is used to transmit data bits with a highest priority, symbol locations with higher priorities are used to transmit data bits with higher priorities, and symbol locations with lower priorities are used to transmit remaining data bits.

16. The method according to claim 13, wherein in frequency domain, the sub-carriers are continuous, discrete, or partly continuous and partly discrete.

17. The method according to claim 13, wherein a plurality of variable symbol interleavers are adopted for data bits with different priority levels.

18. The method according to claim 13, wherein a plurality of variable symbol interleavers are adopted for different sub-bands.

19. The method according to claim 13, wherein settings of a bit's priority are variable in a HARQ transmission process.

20. A variable sub-carrier mapping device comprising:
a HARQ module for outputting data bits of each transmission according to a response information from receivers;
a module for setting priorities for bit locations according to bit interleaving schemes adopted in a transmission process;
a bit sorting module for performing data bit priority setting and transmitting;
a variable interleaver module for interleaving data bits and adopting different interleaving schemes in different transmissions of a HARQ process;
a modulation module for modulating the data bits and outputting a modulated signal; and
a symbol-to-sub-carrier mapping module for mapping input symbols onto sub-carriers, which are transmitted via a transmitting set,
wherein, in the bit sorting module, a bit bears a higher priority if an average interval between sub-carriers adopted for the bit's transmission in the transmission process is longer and the bit bears a lower priority if the average interval between the sub-carriers adopted for the bit's transmission in the transmission process is shorter.

21. The device according to claim 20, wherein the variable interleaver adopts different interleaving schemes in different transmissions of a HARQ process.

22. A variable sub-carrier mapping device comprising:
a receiver for receiving radio signals transmitted from a transmitting device via an air-interface;
a symbol-to-sub-carrier mapping module for intercepting modulated symbols transmitted via sub-carriers;
a demodulation module for demodulating the modulated symbols to output data bits;
a variable de-interleaver for de-interleaving the data bits, where different de-interleaving schemes are applied in different transmissions of a HARQ process;
a module for setting priorities for bit locations according to bit interleaving schemes used during a transmission process;
a bit de-sorting module for specifying a number of system bits, same parity bits and surplus parity bits according to an applied HARQ mechanism and a slotting scheme in each HARQ transmission, and sequentially reading a corresponding number of data bits from corresponding bit locations using an input of the module for setting priorities for bit locations; and
a HARQ module for performing soft combination and decoding to data packets of each transmission, and generating a response message according to a result of the decoding,
wherein in the bit de-sorting module, a bit bears a higher priority, if an average interval between sub-carriers adopted for the bit's transmission in the transmission process is longer, and the bit bears a lower priority, if the average interval between the sub-carriers adopted for the bit's transmission in the transmission process is shorter.

23. The device according to claim 22, wherein the variable de-interleaver adopts different de-interleaving schemes in different transmissions of a HARQ transmissions.

24. A variable sub-carrier mapping device comprising:
a HARQ module which outputs data bits of each transmission according to response information from receivers;
a module for setting priorities for modulated symbol locations according to symbol-to-sub-carrier mapping schemes adopted in a transmission process;
a bit sorting module for performing data bit priority setting and transmitting;
a interleaver module for data bit interleaving;
a modulation module for modulating data bits and outputting a modulated signal; and
a variable symbol-to-sub-carrier mapping module for mapping input data bits onto sub-carriers, which are transmitted via a transmitter, according to mapping relationships between the symbols and the sub-carriers in each HARQ transmission,
wherein a modulated symbol bears a higher priority if an average interval between sub-carriers adopted for the symbol's transmission in the transmission process is longer, and the modulated symbol bears a lower priority if the average interval between the sub-carriers adopted for the symbol's transmission in the transmission process is shorter.

25. The device according to claim 24, wherein the variable symbol-to-sub-carrier mapping module applies different symbol-to-sub-carrier mapping schemes in different transmissions of a HARQ process.

26. A variable sub-carrier mapping device comprising:
a receiver for receiving radio signals transmitted from a transmitting device via an air-interface;
a variable symbol-to-sub-carrier mapping module that intercepts modulated symbols transmitted via the sub-carriers according to the mapping relationship between modulation symbols and sub-carriers in each HARQ transmission;
a demodulation module for demodulating modulated symbols to output data bits;
a de-interleaver for de-interleaving the data bits;
a module for priorities for modulated symbol locations according to symbol-to-sub-carrier mapping schemes adopted in a transmission process;
a bit de-sorting module for specifying a number of system bits, same parity bits, and surplus parity bits according to an applied HARQ mechanism and slotting scheme in each HARQ transmission, and sequentially reading a corresponding number of data bits from corresponding symbol locations using an input of the module for setting priorities for modulated symbol locations; and
a HARQ module for performing soft combination and decoding to data packets of each transmission, and generating a response message according to a result of the decoding, wherein a modulated symbol bears a higher priority, if an average interval between sub-carriers adopted for the symbol's transmission in the transmission process is longer, and the modulated symbol bears a lower priority, if the average interval between the sub-carriers adopted for the symbol's transmission in the transmission process is shorter.

27. The device according to claim 26, wherein the variable symbol-to-sub-carrier mapping module adopts different symbol-to-sub-carrier mapping approaches in different transmissions of a HARQ process.

* * * * *

UNITED STATES PATENT AND TRADEMARK OFFICE
CERTIFICATE OF CORRECTION

PATENT NO. : 8,301,950 B2
APPLICATION NO. : 12/064120
DATED : October 30, 2012
INVENTOR(S) : Bing Bu et al.

It is certified that error appears in the above-identified patent and that said Letters Patent is hereby corrected as shown below:

Title Page

(30) Foreign Application Priority Date

"Aug. 19, 2005 (CN) ................ 2005 1 0092622"

should be

--Aug. 19, 2005 (CN) ............... 2005 1 0092622.2--.

Signed and Sealed this
Ninth Day of July, 2013

Teresa Stanek Rea
*Acting Director of the United States Patent and Trademark Office*